(12) United States Patent
Merjanian et al.

(10) Patent No.: US 11,127,282 B2
(45) Date of Patent: Sep. 21, 2021

(54) CONTEXTUALIZED AUGMENTED REALITY DISPLAY SYSTEM

(71) Applicant: Titan Health & Security Technologies, Inc., Newport Beach, CA (US)

(72) Inventors: Vic A. Merjanian, Newport Beach, CA (US); Michael Beaudoin, Newport Beach, CA (US); Ryan Khalili, Newport Beach, CA (US); Eduardo Juarez, Newport Beach, CA (US); Ed Merjanian, Newport Beach, CA (US)

(73) Assignee: TITAN HEALTH & SECURITY TECHNOLOGIES, INC., Newport Beach, CA (US)

( * ) Notice: Subject to any disclaimer, the term of this patent is extended or adjusted under 35 U.S.C. 154(b) by 0 days.

(21) Appl. No.: 16/205,194

(22) Filed: Nov. 29, 2018

(65) Prior Publication Data

US 2020/0175842 A1 Jun. 4, 2020

(51) Int. Cl.
*G08B 27/00* (2006.01)
*G06T 11/60* (2006.01)

(52) U.S. Cl.
CPC .......... *G08B 27/001* (2013.01); *G06T 11/60* (2013.01)

(58) Field of Classification Search
CPC ............................ G08B 27/001; G06T 11/60
See application file for complete search history.

(56) References Cited

U.S. PATENT DOCUMENTS

| | | | | |
|---|---|---|---|---|
| 9,852,599 | B1* | 12/2017 | Slavin | H04W 4/90 |
| 10,105,108 | B1* | 10/2018 | Taptelis | G16H 80/00 |
| 2014/0167955 | A1* | 6/2014 | Mahajan | G08B 25/14 340/539.12 |
| 2017/0148241 | A1* | 5/2017 | Kerning | H04W 4/12 |
| 2017/0161004 | A1* | 6/2017 | Lee | H04W 4/70 |
| 2018/0054713 | A1* | 2/2018 | South | H04W 4/30 |
| 2018/0189568 | A1* | 7/2018 | Powderly | G06T 7/70 |
| 2020/0103489 | A1* | 4/2020 | Wolfson | G06F 16/29 |

* cited by examiner

*Primary Examiner* — Kee M Tung
*Assistant Examiner* — Khoa Vu
(74) *Attorney, Agent, or Firm* — Sheppard, Mullin, Richter & Hampton LLP

(57) ABSTRACT

Systems and methods for an emergency response system (ERS) to provide an augmented reality overlay on a real-world scene through the heads-up display (HUD) of an emergency responder. In addition to displaying information known to the ERS, an emergency responder terminal of the ERS can detect propagated signals from devices not registered with the ERS. The source and location of the propagated signal can be determined, and a generic display object can be generated representing the location of the propagated signal. The generic display object can be displayed on the HUD when the location of the source of the propagated signal falls within the field of view of a camera component of the emergency responder terminal.

14 Claims, 15 Drawing Sheets

CONTEXTUALIZED AUGMENTED REALITY DISPLAY SYSTEM

BACKGROUND

During emergency situations, the safety and effectiveness of response can increase with the greater amount of information available to both those civilians involved or near the scene and the first responders providing assistance. Obtaining useful information may be difficult, depending on the situation. In many emergencies, visibility may be near zero, making it difficult to find a path to safety, identify potential emergency tools (e.g., fire extinguishers, alarm buttons, etc.), and/or locate potential individuals in need of assistance.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the present disclosure provide augmented reality-based emergency response systems that aid emergency responders and/or individuals in an emergency situation with real-time or near real-time contextualized information to effectively react to a given emergency.

Figure 1:
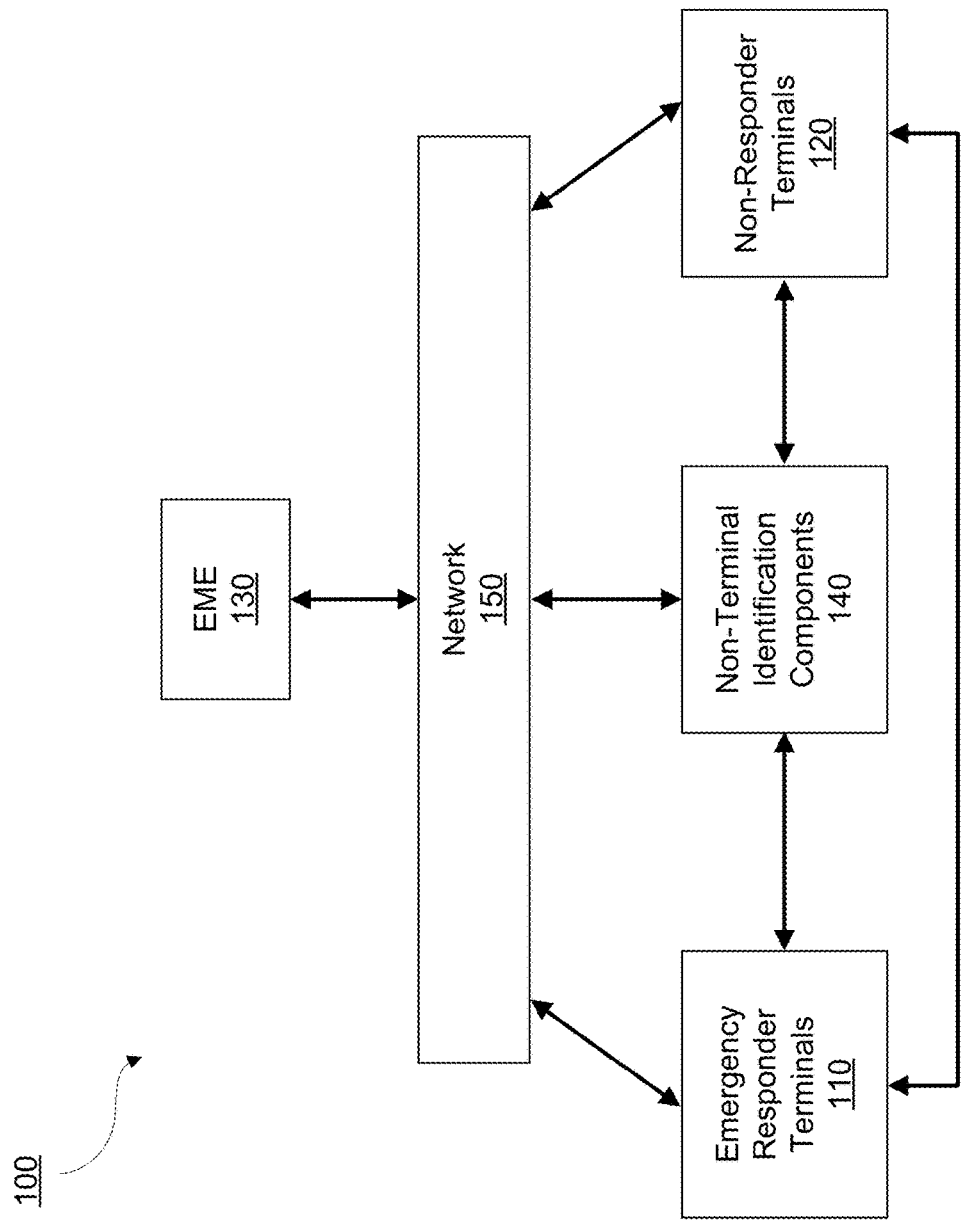
FIG. 1 is a block diagram illustrating an example emergency response system (ERS) in accordance with embodiments of the technology disclosed herein.

FIG. 1 is a block diagram illustrating an example emergency response system (ERS) 1000 in accordance with embodiments of the technology disclosed herein. In various embodiments, the example ERS 1000 may be the ERS disclosed in U.S. Pat. No. 9,699,310, issued Jul. 4, 2017, U.S. patent application Ser. No. 15/825,094, filed Nov. 28, 2017, and U.S. patent application Ser. No. 15/860,630, filed on Jan. 2, 2018, (hereinafter, "the Incorporated References") each of which is hereby incorporated by reference herein in their entirety.

As shown in FIG. 1, ERS 100 includes an emergency management entity (EME) 130. EME 130 serves as a backbone for the ERS 100, providing a variety of services, functionality, and information to the various components connected to the EME 130. In various embodiments, the EME 130 includes one or more servers executing non-transitory machine-readable instructions to perform the functions disclosed herein. The one or more servers may be co-located at a data center in some embodiments, while in others the one or more servers may be within a distributed network (e.g., local area network (LAN), wide area network (WAN)). Virtualization may be utilized at EME 130 to provide virtualized functions or services to the various components of ERS 100. In various embodiments, EME 130 may comprise a cloud server, either alone or in combination with one or more dedicated servers.

EME 130 may be communicatively coupled to a number of other components of ERS 100 through a network 150. In various embodiments, the network 150 may implement one or more communication protocols and include the hardware and software components (i.e., interfaces) required to establish such a communications link. Non-limiting examples of communication protocols that may be implemented within network 150 include: cellular communications protocols (e.g., UMTS, LTE, WiMAX, 3G, 4G, 5G, etc.); wired communications protocols (e.g., cable, DSL, fiber-optic, etc.); wireless communications protocols (e.g., Wi-Fi, Bluetooth®, ZigBee®, near field communication (NFC), etc.). In various embodiments, EME 130 may be communicatively coupled to one or more databases, components, or entities (not pictured) external to the ERS 100 (e.g., databases of government entities) to exchange information. As a non-limiting example, EME 130 may obtain information regarding building layouts, locations of emergency infrastructure (e.g., fire hydrants, etc.), and other information from a local government entity or entities maintaining a database of such information.

As illustrated in FIG. 1, emergency responder terminals 110 and non-responder terminals 120 are connected to EME 130 through network 150. In various embodiments, emergency responder terminal 110 and non-responder terminals 120 comprises mobile devices including one or more processors in the possession of emergency responders and other non-responders (respectively) associated with ERS 100.

Non-limiting examples of emergency responder terminals 110 and non-responder terminals 120 include: smartphones; tablets; netbooks; laptop computers; smartwatches; heads-up displays (HUDs); or any other mobile device. In various embodiments, emergency responder terminals 110 and non-responder terminals 120 may include sensor components, including but not limited to: cameras; microphones; speakers; gyroscopes; wireless transceivers and wired communication interfaces enabling one or more communication protocols as discussed with respect to network 150; barometers; global positioning system (GPS) hardware; medical sensors (e.g., electrocardiogram (ECG or EKG)); among other sensor components included within a mobile device. In various embodiments, emergency responder terminals 110 and non-responder terminals 120 may be similar to the emergency responder terminals and target terminals discussed in the Incorporated References.

In various embodiments, emergency responder terminals 110 and non-responder terminals 120 may communicate with each other through network 150. In other embodiments, emergency responder terminals 110 and non-responder terminals 120 may communicated directly with each other. For a non-limiting example, emergency responder terminals 110 and non-responder terminals 120 may detect the presence of another terminal and communicate over a local communications link, for example over Bluetooth®. In another non-limiting example, one or more emergency responder terminals 110 or non-responder terminals 120 may include one or more beacons, which may be detected by another terminal enabling the exchange of information (e.g., the location of the terminal with the beacon).

In various embodiments, emergency responder terminals 110 and non-responder terminals 120 may run an emergency management application associated with ERS 100. The emergency management application may be designed to provide a variety of services or functions of ERS 100, such as the functions/services disclosed in the Incorporated References. Using the emergency management application may provide, distribute, or otherwise convey data obtained via any one or more of the resources within ERS 100 (discussed with respect to FIG. 2). In various embodiments, the emergency management application is not required to perform one or more of the services discussed herein. For a non-limiting example, a non-responder terminal 120 not running the emergency management application may still transmit and receive information from one or more non-terminal identification components 140 and/or emergency responder terminals 110.

The example ERS 100 of FIG. 1 further includes one or more non-terminal identification components 140. Non-terminal identification components 140 may comprise one or more types of devices and/or items installed within an area in which an emergency is occurring that provide information. Non-limiting examples of non-terminal identification components 140 include: location beacons; proximity sensors; radio frequency identification (RFID) tags; among others. In various embodiments, non-terminal identification components 140 may include one or more components required for implementing communications protocols, such as those discussed above with respect to network 150. In some embodiments, non-terminal identification components 140 may include a Bluetooth® low energy (BLE) beacon.

Non-terminal identification components 140 provide information external to emergency responder terminals 110 and/or non-responder terminals 120. For a non-limiting example, a location beacon may be installed in and associated with room 416 of a hotel, configured to transmit a signal indicating that the beacon is "room 416". When an emergency responder terminal 110 or a non-responder terminal 120 comes within the transmission range of the location beacon, it would pick up the signal and know that it is in room 416. In various embodiments, non-terminal identification components 140 may include one or more indicator components configured to assist a person locate the non-terminal identification component 140. Non-limiting examples of indicator components include lighting elements and/or speakers, among other components which provide a detectable indication of the location of the non-terminal identification component 140 to assist an individual to locate the non-terminal identification component 140. As a non-limiting example, non-terminal identification component 140 may be installed next to a fire extinguisher and includes a lighting element that is triggered to activate when an emergency responder terminal 110 and/or non-responder terminal 120 is within range. In this way, either individual will be able to locate the fire extinguisher in an emergency where visibility may be diminished.

Installing non-terminal identification components 140 facilitates the identification of locations, equipment, and/or other landmarks prior to an emergency situation, to help mitigate the risk associated with an emergency. The EME 130 in some embodiments may store the positional data related to one or more non-terminal identification components 140 in storage media such that display objects may be preconfigured for each non-terminal identification component 140.

In various embodiments, non-terminal identification components 140 may include one or more sensor components for collecting information about the environment. Non-limiting examples of sensor components that may be implemented within non-limiting identification components 140 include: thermal sensors; smoke detectors; image sensors; infrared image sensors; audio sensors; altimeters; pressure sensors (e.g., barometers); RF sensors; among others. In various components, non-terminal identification components 140 may transmit the information collected by the one or more sensors to EME 130, emergency responder terminals 110, and/or non-responder terminals 120. Including additional sensor components in the non-terminal identification components 140 increases the amount of the information collected about the environment around each non-terminal identification component 140, providing additional context for assessing the situation.

Figure 2:
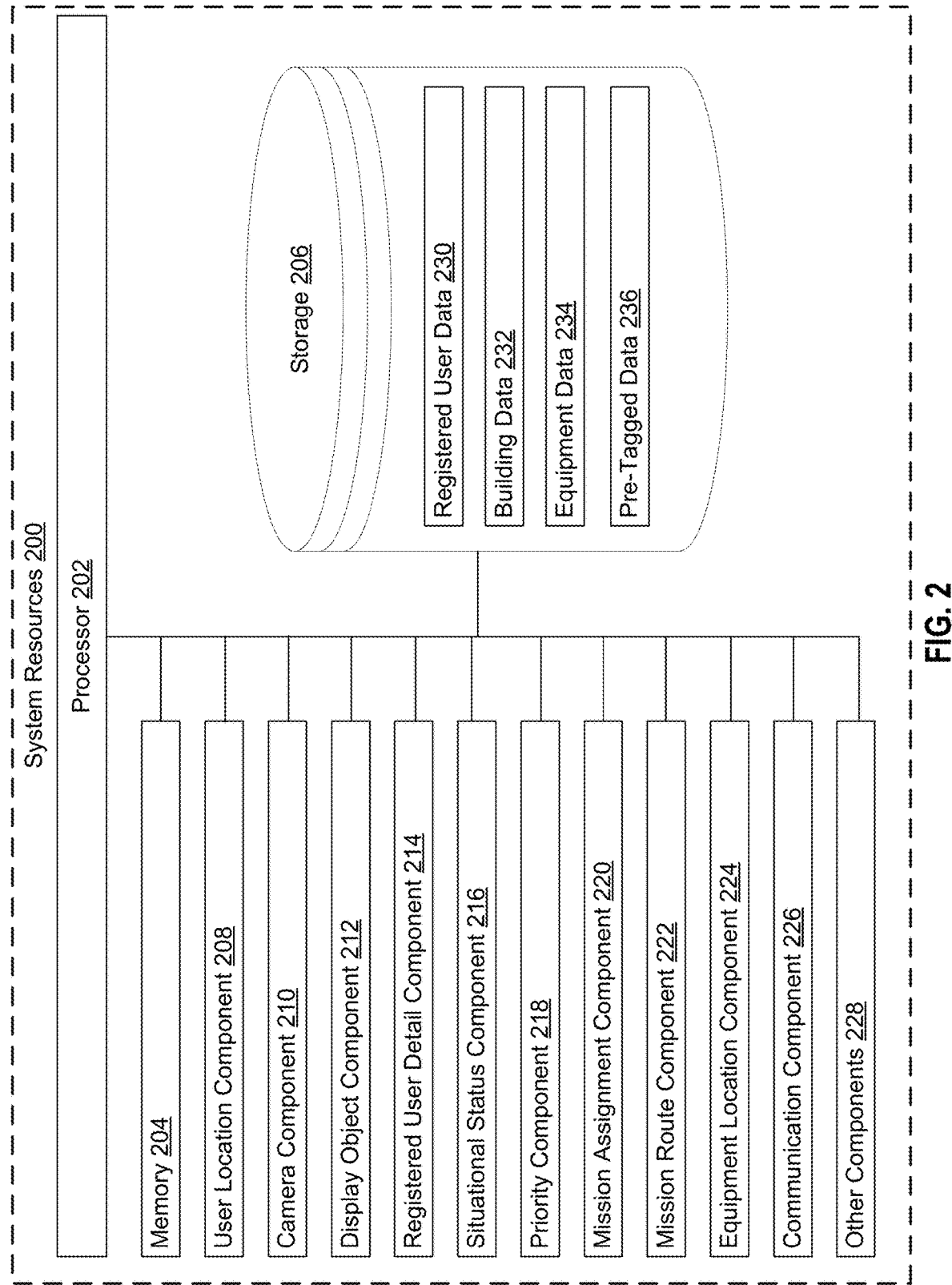
FIG. 2 is a diagram illustrating example resources of ERS in accordance with embodiments of the technology disclosed herein.

FIG. 2 is a diagram illustrating example resources of ERS 100 in accordance with embodiments of the technology disclosed herein. Each component discussed with respect to FIG. 1 provides one or more resources available within ERS 100. For ease of discussion, FIG. 2 illustrates each type of resource available, not the specific resources available within a particular component. The relationship between the resources of ERS 100 illustrated in FIG. 2 and the various components will be explained during the detailed discussion of each resource.

As shown in FIG. 2, the system resources 200 may include one or more processors or processing engines 202 (represented by processor 202, one or more memories (represented by memory 204), and one or more storage units (represented by storage 206). Storage 206 may comprise one or more types of storage device, including but not limited to: a hard disk drive, a magnetic tape drive, USB drive, an optical disk drive, a CD or DVD drive (R or RW), a server storage device (e.g., or other removable or fixed media drive. In various embodiments, storage 206 may comprise a storage area network (SAN) connected to the ERS 100 over network 150, an independent network, or a combination of both. Storage 206 may be used to store a variety of data for use by other resources within system resources 200. Storage 206 may store registered user data 230, building data 232, equipment data 234, and/or pre-tagged data 236. In various embodiments each of this data types may be stored on separate components of storage 206, within separate partitions of the same storage media, or a combination of both. Registered user data 230 comprises details regarding a registered user of ERS 100. In various embodiments, registered user data 230 may include, but is not limited to, name of the registered user, age, height, weight, pre-existing medical conditions, number of registered non-responder terminals, among other items regarding the registered user.

Building data 232 comprises information regarding specific structures and/or other constructions (e.g., bridges, tunnels, parking structures, etc.) where an emergency is occurring. In various embodiments, building data 232 may be pre-stored in storage 206, dynamically obtained through manual entry or from a third party database, or a combination of both. Non-limiting examples of building data 232 include: structure layouts, including floors and rooms; location of emergency exits; boiler or other mechanical rooms; main gas, electric, and/or water shut off valves; among others. During an emergency, the building data 232 may be retrieved and utilized to perform the functions discussed in detail with respect to FIGS. 3A-8.

Equipment data 234 in various embodiments comprises data regarding the equipment. Non-limiting examples of equipment data 234 include: type of equipment; operational status of equipment; identification of effective uses; among other information.

In various embodiments, pre-tagged data 236 may comprise information within the vicinity of an emergency but which is not categorized under the other types of data, collectively referred to as "landmarks". For example, building data 232 may not include the location of fire hydrants external to a structure. However, the location of fire hydrants and similar types of municipal infrastructure can be identified prior to any emergency developing. In various embodiments, such items may be tagged prior to any emergency and stored in storage 206 of the ERS as pre-tagged data 236. The pre-tagged data 236 may include similar information as the equipment data 234, if available. Other non-limiting examples of items that may be pre-tagged include: hospitals near by to the emergency; known construction sites within the vicinity; transit routes through the vicinity; among others.

Memory 204 may comprise one or more types of machine-readable memory components, including but not limited to read-only memory (ROM) and random access memory (RAM). The memory 204 may provide in various embodiments a cache functionality to system resources 200. Memory 204 may be configured with non-transitory machine-readable instructions which, when executed by processor 202, cause ERS 100 to effectuate one or more features discussed below with respect to elements 208-228 (which may be embodied in or effectuated by one or more of emergency responder terminals 110, non-responder terminals 120, non-terminal identification components 140, and/or EME 130). System resources 200 may include one or more of a user location component 208, camera component 210, display object component 212, registered user detail component 214, situational status component 216, priority component 218, mission assignment component 220, mission route component 222, equipment location component 224, communication component 226, and other components 228.

In various embodiments, user location component 208 obtains location data of one or more of emergency responder terminals 110, non-responder terminals 120, and/or non-terminal identification components 140. In some embodiments, such data may be obtained via location resources (e.g., GPS circuitry, altimeter, barometer, beacons, gyroscope, etc.) local to such terminals, and may be provided to EME 130 over network 150. Location component 208 may include, but is not limited to, a GPS circuit, an altimeter, a pressure sensor, and other types of position sensors. EME 130 may broadcast the received location data to each of the other terminals and/or components, while in some embodiments EME 130 may store the location data in storage 206 and distribute the location data upon request. Location data is indicative of a geospatial location of one or more of emergency responder terminals 110, non-responder terminals 120, and/or non-terminal identification components 140.

In various embodiments, user location data may be obtained by the location component 208 through transmission of location data requests to one or more of emergency responder terminals 110, non-responder terminals 120, and/ or non-terminal identification components 140. In various embodiments, EME 130 can transmit location data requests over network 150 to the other components, requesting updated information regarding the position of each component. In some embodiments, emergency responder terminals 110 and/or non-responder terminals 120 may transmit location data requests to other terminals for updated information on the other terminals' location, or to EME 130 to request updated location information on all components in ERS 100.

In various embodiments, the location for an emergency responder terminal 110 and/or non-responder terminal 120 may be determined using location data from location hardware local to the terminal, location data from external sources (e.g., non-terminal identification components 140), or a combination of both. Within buildings and other structures, GPS signals may be weaker, impacting the accuracy in pinpointing a user's specific location within the structure. Moreover, GPS does not provide vertical positioning, making more accurate positioning of individuals within multistory structures difficult. Knowing which floor an individual is on may be vital to rendering safe and efficient assistance. In various embodiments, supplementing location data from a terminal with location data from one or more non-terminal identification components 140 can increase the accuracy of locating individuals during an emergency.

For a non-limiting example, a large office building may implement a version of ERS 100, installing a plurality of non-terminal identification components throughout the building. For ease of discussion, in this example the non-terminal identification components installed are location beacons comprising a BLE circuit. Each location beacon may be configured to transmit a signal comprising location data identifying the location of the beacon. When a non-responder terminal 120 comes within range of one or more location beacons, the terminal can receive the signal from the location beacons. The ERS 100 may determine a location of the non-responder terminal 120 based on the location data received from the location beacons, in addition to location data obtained by the location hardware of the non-responder terminal 120 (e.g., GPS circuitry, etc.). Where the GPS signal is weak (impacting its accuracy), the ERS 100 may determine to use the location of the closest location beacon as the position of the non-responder terminal 120 within the building.

In various embodiments, a terminal's position may be determined by the EME 130, the non-responder terminal 120, or responsibility for making the determination may be split between the EME 130 and non-responder terminal 120. In various embodiments, the location data from one or more location beacons may be used to identify the non-responder terminal's 140 precise location between the location beacons, while in other embodiments only the location data of the closest location beacon is used as the non-responder terminal's 140 position. Whether to use a location beacon's location data as opposed to the location data obtained by local hardware of the non-responder terminal 120 may be determined based on a signal strength of the GPS signal at the time in some embodiments.

In various embodiments, the location data of the various non-terminal components 140 may be stored in storage 206 as building data 232 and/or equipment data 234. Location data may include information identifying specific points of interest within a structure which may be of relevance during an emergency, such as emergency exits and equipment. In various embodiments, location data may include information obtained from outside sources, such as from government or other databases maintaining information on the structure (e.g., blueprints, structural diagrams, emergency action plans, etc.), which may be stored as building data 232 and/or equipment data 234 in storage 206. The building data 232 and/or equipment data 234 may be distributed across memory components of the EME 130, emergency responder terminals 110, non-responder terminals 120, and/or non-terminal identification components 140 in various embodiments. This way, location information available to ERS 100 may be enhanced with as much detail as desired for a give application or as desired by a given implementer of ERS 100.

In still a further non-limiting example, and as discussed further hereafter with respect to equipment location component 224, in various embodiments non-terminal identification components 140 may include location beacons, proximity sensors, receivers, RFID tags, or any of the elements discussed herein with respect to terminals (e.g., GPS circuit, altimeter, barometer, etc.), installed in an indoor location where a piece of usable equipment is stowed within the building, and/or an outdoor location where a piece of usable equipment is kept. Such equipment may include, for example, a fire extinguisher, an epinephrine pen (EpiPen), an axe, an oxygen mask, a defibrillator, a hose, a fire alarm, a fire hydrant, a hose, a rope, etc. In some instances, such location beacons, proximity sensors, receivers, RFID tags, GPS circuits, altimeters, barometers, etc. may be affixed to the item of equipment itself (or the housing or casing associated with such equipment) and may provide location data to EME 130, emergency responder terminals 110, and/or non-responder terminals 120 to provide an indication of equipment in the vicinity of the emergency. In some embodiments one or more non-terminal identification components 140 may embody any and all of the technology and features discussed herein with respect to non-responder terminals 120, but instead of being associated with a user the components are associated (and in some instances mechanically coupled) with a piece of equipment.

In various embodiments, the emergency management application may utilize, operate, and/or control one or more system resources 200, including resources local to EME 130, emergency responder terminals 110, non-responder terminals 120, and/or non-terminal identification components 140. As a non-limiting example, the emergency management application may operate a camera component 210 of an emergency responder terminal 110 or non-responder terminal 120 to capture a portion of a real-world scene within the field of view of the camera lens and CMOS array of the respective device.

Systems resources 200 may further include a display object component 212 in various embodiments. Display object component 212 may define display objects that may identify the location of one or more of emergency responder terminals 110, non-responder terminals 120, and/or non-terminal identification components 140. A display object may include any graphic (e.g., a pin, a bubble, a tile) that may be displayed on an electronic display. Display object component 212 may determine when a portion of a real-world scene captured by a camera component 210 of an emergency responder terminal 110 and/or a non-responder terminal 120 captures a region of space wherein another terminal and/or one or more non-terminal identification components 140 are located. As the field of view of the camera component 210 may change as the user pans across or moves within an area, display object component 212 may be configured in various embodiments to cause the display objects to display additional objects (e.g., other terminals and/or equipment) captured in the changing field of view while removing those objects no longer within the field of view. The display objects may be overlaid on the real-world scene captured by the camera component 210, augmented the real-world image with additional information helpful during an emergency.

Registered user detail component 214 obtains information stored in a user profile for one or more registered users. Such information may be provided by a user when first creating a user profile upon registering with ERS 100 (e.g., registration and sign-up via the emergency management application). Such information may include the user's name, age, gender, height, weight, contact information (phone, email, etc.), contact information preferences, emergency contact information, family information (spouse, children, siblings, parents, etc.), employment information, skillset, completed emergency response trainings (e.g., CPR certified, tactical training, bomb deactivation training), health conditions or tendencies (e.g., diabetes, asthma, claustrophobia, etc.), physical disabilities (e.g., visually impaired, hearing impaired, paraplegic, etc.). Such information may also include a categorical designation. The categorical designation may be as simple as selecting either an "emergency responder" (e.g., responder) category or a "standard user" category (e.g., non-responder). Such information may further include details about the device the user designates as their primary terminal—e.g., emergency responder terminal, non-responder terminal. Any and all such information may be stored in any electronic storage available to ERS 100, such as in a registered user data 230 sector of storage 206.

In some embodiments, emergency responder terminals 110 and non-responder terminals 120 are distinguished from one another by the category of registered users with which they are associated as stored in the user profiles for the one or more registered users. According to some embodiments, emergency responder terminals 110 are associated with a category of registered users designated as emergency responders (e.g., persons or other entities charged with responding to an emergency situation, resolving an emergency situation, or assisting others who are involved in an emergency situation). According to some embodiments, non-responder terminals 120 are associated with a category of potential target (e.g., a standard user of or subscriber to ERS 100).

Emergency responders may include public individuals, groups, or entities. For instance, public emergency responders might include: a police department, a division of a police department (e.g., a task force, bomb squad, etc.), an individual police officer or group of police officers; a fire department, a division of a fire department, an individual fireman or group of firemen; a federal law enforcement agency (FBI, CIA, etc.), a division of a federal law enforcement agency, or an individual field officer or team of field officers; a local poison control department, a division of a local poison control department, an individual poison control agent or group of agents; or any other public entity, individual, or group of individuals designated as such, and the like. Emergency responders may also include private individuals, groups, or entities. For instance, private emergency responders might include security guards, property patrolmen, or any other private entity, individual, or group of individuals designated as such, and the like.

In some embodiments, the emergency responders category may be further divided into subcategories that have different privileges, permissions, or capabilities to interact with and control one or more aspects of ERS 100. In some embodiments the subcategories may correspond to the hierarchical structure relevant to a group of emergency responders. For example, the emergency responders in a particular scenario might include a local police task force. The task force might be made up of one commander, one managing officer that reports to the commander, and five field officers that report to the managing officer. In such a scenario, subcategories might include: "commanders," "managing officers," and "field officers," with descending privileges, permissions, or capabilities to interact with and control one or more aspects of ERS 100. Various applications will be made apparent upon review of the entire disclosure herein.

According to some embodiments, non-responder terminals 120 are associated with any non-emergency responder category of registered users, which may include but not be limited to registered users or entities that are in danger, are involved in an emergency situation, or which are otherwise in need of assistance from an emergency responder. Just as emergency responders may be further divided into subcategories that have different privileges, permissions, or capabilities to interact with and control one or more aspects of ERS 100, so to can the non-emergency responder category. For instance, if a school campus were to adopt an embodiment of ERS 100 and the school campus were to be under lockdown because of a bomb threat, the subcategories of registered users within the non-emergency responder category may include the school's dean, administrators, teachers, students, and visitors. Each may be given different privileges, permissions, or capabilities to interact with and control one or more aspects of ERS 100. Various applications will become apparent upon review of the entire disclosure herein.

Situational status component 216 obtains situational status information in real-time from emergency responder terminals 110, non-responder terminals 120, and/or non-terminal identification components 140 in emergency situations. Situational status information may include any information that provides additional context about the nature of the situation within the vicinity of a given user—e.g., number of other people in the same vicinity as the user with either terminal 110, 120, an injury sustained by the user (or a person in the vicinity of the user), a reaction being experienced by the user (or a person in the vicinity of the user), a request for specific type of help needed or number of responders needed, and/or images, sounds, or video of the vicinity.

Such situational status information may be provided as preconfigured messages/data the user can automatically send by tapping or otherwise selecting an associated buttons, icon or tile from their emergency management application, for example, or may be customized messages/data the user types or records into their unit via their emergency management application, for example. Examples of buttons, icons, or tiles that may be useful to transmit preconfigured messages via the target terminal version of the app may include one or more of the following: "CPR Needed," or "Immobilized," or "Children in Vicinity," "Move on to other targets," and the like. Example customized messages the non-responder terminals 120 may transmit may include messages typed by the user of the unit, such as: "There is a person in my vicinity in need of CPR, please send CPR certified emergency responder as soon as possible," or "I am in the vicinity of the emergency but there is a clear path for my escape, no need to assist me, move on to others," or "I am trapped and cannot find an exit," or, "I've injured my leg and am immobile, please send two or more emergency responders to carry me out," or "the smoke from the fire is becoming unbearable, people around me are losing consciousness and I expect I will shortly too," and the like.

Examples of buttons, icons, or tiles that may be useful for the emergency responder terminal version of an emergency management application may include one or more of the following: "Send additional responders," or "Mission Assignment Completed," or "Available for New Mission Assignment," and the like. Example customized messages the emergency responder terminals may transmit may include messages typed by the user of the unit, such as: "I need three more emergency responders at my present location," or "The person I came to assist was passed out when I arrived, please send another responder with medical training within the next 10 minutes," or "the south exit of the building is blocked by a pillar that has fallen in front of the exit," and the like. Further discussion of such functionality and graphical user interfaces (GUIs) is provided within the Incorporated References.

In various embodiments, situational status information may include environment data obtained through one or more sensor components of emergency responder terminals 110, non-responder terminals 120, and/or non-terminal identification components 140. The sensor components may include those sensor components discussed with respect to FIG. 1. By collecting information through one or more different sensors, ERS 100 can supplement the location data of the various entities with more context as to the actual situation. For a non-limiting example, a non-terminal identification component 140 may include a heat or thermal sensor. The non-terminal identification component 140 can detect heat in the vicinity of the component, and provide that information to EME 130, emergency responder terminal 110, and/or non-responder terminal 120. Using this information, ERS 100 may be configured to identify a fire in the vicinity of the non-terminal identification component 140, enabling ERS 100 to determine whether a particular route is a safe path away from an emergency.

Situation status component 216 may actively inquire about such situational status information (e.g., transmit requests for information), may passively remain open to receiving any such information that is transmitted by a unit (e.g., a receiver configured to receive signal transmissions from units), or both.

Priority component 218 may determine a priority for one or more non-responder terminals 120 among a plurality of non-responder terminals 120. Priority may be determined by applying one or more predefined priority criteria, such priority criteria based upon one or more of user location information, equipment location information, registered user detail information, and situational status information. Priority criteria may be defined in any manner. For example, priority criteria may include an expression that computes a weighted score for each non-responder terminal under consideration, and rank the imminence of the need to assist the user based on the score. For example, a priority criteria may be given by the expression:

PRIORITY SCORE=(Factor1*$w1$)+ (Factor2*$w2$)+ . . . +(Factor$N$*$wN$)  [1]

For example, suppose that an implementation of ERS 100 considers two different factors in determining priority. Suppose, in this example, that Factor1 represents a score based on the time within which assistance must be rendered, and Factor2 represents a score based on whether there are children in the vicinity of a responder or not. Such scores and/or scoring criteria may be preset or otherwise predefined and stored within ERS 100.

For example, suppose the following scores are associated with the following times within which assistance must be rendered (e.g., for Factor1):

TABLE 1.0

| Time ranges | Score |
|---|---|
| 0 min ≤ t ≤ 5 min | 5 |
| 5 min < t ≤ 10 min | 4 |
| 10 min < t ≤ 20 min | 3 |
| 20 min < t ≤ 30 min | 2 |
| 30 min < t ≤ 60 min | 1 |
| 60 min < t | 0 |

Further suppose that the following messages (column B of Table 1.1) are received at particular time (column D of Table 1.1) from three non-responder terminals (TU) (column A of Table 1.1), and the following scores (column F) are determined for each based on, in this example, information gathered from the message itself (e.g., "AT" in column C of Table 1.1.), the time the message was received ("TR" in column D of Table 1.1), and the present time (CT in Table 1.1). In this particular example, the scoring expression may be given by (RT+t)−CT, and the score may be determined by a comparison of the result of the scoring expression with Table 1.0 above.

TABLE 1.1

| | | | C Estimated time within which assistance is to be rendered(AT) | D Time TBM was received (TR) | E (TR + t) − CT | F Factor1 Score |
|---|---|---|---|---|---|---|
| | A | B Message | | | | |
| | TU 1 | "A child in my vicinity is unconsciousand needs helpimmediately" | 1 minute or less | 12:00 PM | (12:00 PM + 0:01) − 12:00 PM = 0:01 1 minute | 5 |
| | TU 2 | "I am trapped alone in a room where the rubblefrom the earthquake has blocked the door; but I am safe and could wait for up to2 hours for assistance if others needhelp first" | 2 hours | 12:02 PM | (12:02 PM + 2:00) − 12:00 PM = 2:02 122 minutes | 0 |
| | TU 3 | "I sustained an injury and am bleeding pretty badly, I need assistance within the next 20 minutes. | 20 minutes | 11:58 AM | (11:58 AM + 0:20) − 12:00 PM = 0:18 18 minutes | 3 |

Current Time (CT) = 12:00 PM

Extending the example above, suppose the following scores are based on whether there are children in the vicinity of a responder or not (e.g., Factor2):

TABLE 2.0

| Children in the vicinity of messaging Target terminal | Factor2 Score |
|---|---|
| Yes | 2 |
| Unknown | 1 |
| No | 0 |

And further suppose, just as above with regard to Table 1.1, that the following messages (repeated in column B of Table 2.1) are received at particular time (repeated in column D of Table 2.1) from three non-responder terminals (TU) (repeated in column A of Table 1.1), and the following scores for Factor2) (column F) are determined for each based on, in this example, information gathered from the message itself concerning children in the vicinity of the TUs. In this particular example, the scores may be determined by a comparison of a message analysis with Table 2.0 above.

TABLE 1.1

Current Time (CT) = 12:00 PM

| A | B Message | C Estimate of whether any children are within the vicinity | D Time TBM was received (TR) | E Factor 2 Score |
|---|---|---|---|---|
| TU 1 | "A child in my vicinity is unconscious and needs help immediately" | Yes | 12:00 PM | (12:00 PM + 0:01) − 12:00 PM = 0:01 1 minute |
| TU 2 | "I am trapped alone in a room where the rubble from the earthquake has blocked the door; but I am safe and could wait for up to 2 hours for assistance if others need help first" | No | 12:02 PM | (12:02 PM + 2:00) − 12:00 PM = 2:02 122 minutes |
| TU 3 | "I sustained an injury and am bleeding pretty badly, I need assistance within the next 20 minutes. | Unknown | 11:58 AM | (11:58 AM + 0:20) − 12:00 PM = 0:18 18 minutes |

ERS 100 may apply the scoring expression given in Eqn. 1 above, for example, and determine the priority scores accordingly. A summary of such priority scores in the illustrative example above are shown in Table 3.0 below:

TABLE 3.0

Current Time (CT) = 12:00 PM

| A | B Message | C Factor1 Score | D Factor2 Score | E PRIORITY SCORE |
|---|---|---|---|---|
| TU 1 | "A child in my vicinity is unconscious and needs help immediately" | 5 | 2 | 7 |
| TU 2 | "I am trapped alone in a room where the rubble from the earthquake has blocked the door; but I am safe and could wait for up to 2 hours for assistance if others need help first" | 0 | 0 | 0 |

TABLE 3.0-continued

Current Time (CT) = 12:00 PM

| A | B Message | C Factor1 Score | D Factor2 Score | E PRIORITY SCORE |
|---|---|---|---|---|
| TU 3 | "I sustained an injury and am bleeding pretty badly, I need assistance within the next 20 minutes. | 3 | 1 | 4 |

Based on the priority scores computed by ERS 100 and shown above in Table 3.0, ERs 100 may determine that, as between the three target terminals in the above example, TU 1 is the first priority (with the highest priority score), TU 3 is the second priority (with the second highest priority score), and TU 2 is the third priority (with the lowest priority score). ERS 100 may allocate assignments for emergency responders to be dispatched to the aid of the non-responder terminal in accordance with the priority determined among the plurality of units under consideration for a given application.

Mission assignment component 220 matches candidate emergency responders with an individual in need of assistance, and may issue a notification or other message to the emergency responder through an emergency responder terminal 110, and/or to the individual through a non-responder terminal 120. Mission assignment component 220 may determine which one or more emergency responders should be dispatched to assist one or more individuals in need of assistance, and such determination may be determined on any one or more of: a location of a candidate emergency responder terminal 110, a location of a non-responder terminal 120 in need of assistance, a location of a piece of equipment, a priority among a plurality of individuals, one or more pieces of information stored in a user profile for one or more registered users (either or both of emergency responders or individuals associated with emergency responder terminals 110 and non-responder terminals 120), or any information derived from the foregoing (e.g., absolute distance or route distance between a given emergency responder terminal and a given non-responder terminal 120). Mission assignment component 220 may, in accordance with one or more embodiments, further receive feedback from a registered user (e.g., an emergency responder, an individual, etc.) indicating the need for additional assistance for a particular assignment, or the need for a reassignment for one reason or another. ERS 100 may automatically make an additional assignment (e.g., summon another emergency responder), make a new assignment, or modify an assignment based on the feedback and further based on other information available to it. The other information available to ERS 100 and which may be used for determining an additional assignment, new assignment, or modification to an assignment may include: (i) nearby emergency responders available to assist, (ii) nearby emergency responders with a given skillset or with a given capability, (iii) nearby individuals able to assist, etc. An example implementation is discussed with reference to selectable icon 1953 and selectable icon 1954 of FIG. 3C.

Mission route component 222 may determine one or more routes providing possible paths of travel that an emergency responder may follow in order to reach the non-responder terminal 120. Mission route component 222 may draw upon map information stored within ERS 100 (e.g., within storage 206) or otherwise accessible to ERS 100 (e.g., via a map database accessible online) to determine and/or provide a route upon which the responder may travel to reach the non-responder terminal 120. Such map information may be based on building information (e.g., stairwell locations, elevator bays, escalators), online map information (e.g., google maps information). The route provided may be a walking route, driving route, bicycle route, or any route suitable for any mode of travel (escalator route, elevator route, etc.) or any combination of the foregoing. The determined route or routes may be displayed as an overlay on a portion of a real-world scene captured by a camera component 210 of an emergency responder terminal, or may be provided as a list of visual instructions, a list of audio instructions, or in any other format or manner desired. In some embodiments, multiple routes are determined and provided to an emergency responder via the emergency responder's emergency responder terminal 110.

Referring back now to display object component 212, in some embodiments a display object component 212 may define one or more display objects representing a route of travel depicting a virtual path between the location of an emergency responder terminal 110 and the location of a non-responder terminal 120, location data for which having been obtained and/or stored by system resources 200, and the route determined by mission route component 222. A display object may include any graphic (e.g., a broken or solid line, arrow, etc.) that may be displayed on an electronic display of the emergency responder terminal.

Display object component 212 may dynamically refresh and/or adapt display object definitions such that the display objects displayed on display of respective units update to reflect recent information (e.g., location or orientation of respective units). For example, display object component 212 may adjust the position of display objects representing a route responsive to a determination that a portion of a real-world scene captured by a camera component 210 of an emergency responder terminal 110 has changed; the changed portion capturing a different region of the real-world scene than was previously captured, such that the region of space where the non-responder terminal 120 location is represented on the display changes. This is also applicable in the reverse (i.e., updating the display of a non-responder terminal 120 when the real-world scene changes).

Equipment location component 224, in accordance with various embodiments of the present disclosure obtains equipment location data of one or more units of equipment in the vicinity of the emergency (the vicinity defined as desired for a given implementation). In some embodiments, such equipment location data may be obtained via location resources (e.g., location circuitry) local to or coupled with pieces of such equipment, and may be provided to ERS 100 over network 150 (which in some instances may be include mesh network options). Equipment location data may be indicative of the geospatial location of one or more pieces of equipment in the vicinity of the emergency.

In accordance with one or more embodiments of the present disclosure, ERS 100 may obtain location data by actively transmitting a location data request to one or more non-terminal identification components 140 coupled with or near pieces of equipment, thereby prompting the one or more non-terminal identification components 140 (e.g., GPS modules, altimeter, barometer, beacons, RFID tags, etc.) to obtain location information and cause a data packet containing the location data (e.g., location details) to be generated and/or transmitted to a computing resource of ERS 100. For instance, EME 130 of ERS 100 may receive a responsive transmission from the one or more pieces of equipment (i.e., from a communication interface coupled with a piece of equipment) containing the one or more pieces of equipment's respective equipment location data, and ERS 100 may propagate and/or store such information within an electronic storage or memory of ERS 100 as desired for a particular application or by a particular resource coupled to or within ERS 100.

Equipment location data may indicate geospatial location of a piece of equipment in the vicinity of the emergency, including longitude and latitude coordinates, degrees/minutes/seconds location parameters, altitude above sea level, altitude above ground level, etc. Equipment location component 224 may be utilized to identify geospatial location of a piece of equipment. The equipment location component 224 may be similar to the non-terminal identification components 140 discussed with respect to FIG. 1. Equipment location component 224 may comprise one or more circuits, modules, or chips local to the units themselves. For example, equipment location component 224 may include a GPS sensor, an altimeter, a pressure sensor (e.g., a barometer), beacon (e.g., Bluetooth beacon), RFID tag, and the like. In some embodiments, equipment location component 224 may further comprise hardware and software operating on EME 130 and communicatively coupled with location sensors of one or more units. In various embodiments, equipment location component 224 may use equipment data 234 from storage 206 to associate details about the equipment with the position determined using the equipment location component 224. As discussed with respect to FIGS. 3A-3G, the associated equipment data 234 may be associated with a display object for the equipment to present the equipment data 234 to an emergency responder or non-responder through a respective terminal.

Figure 3A:
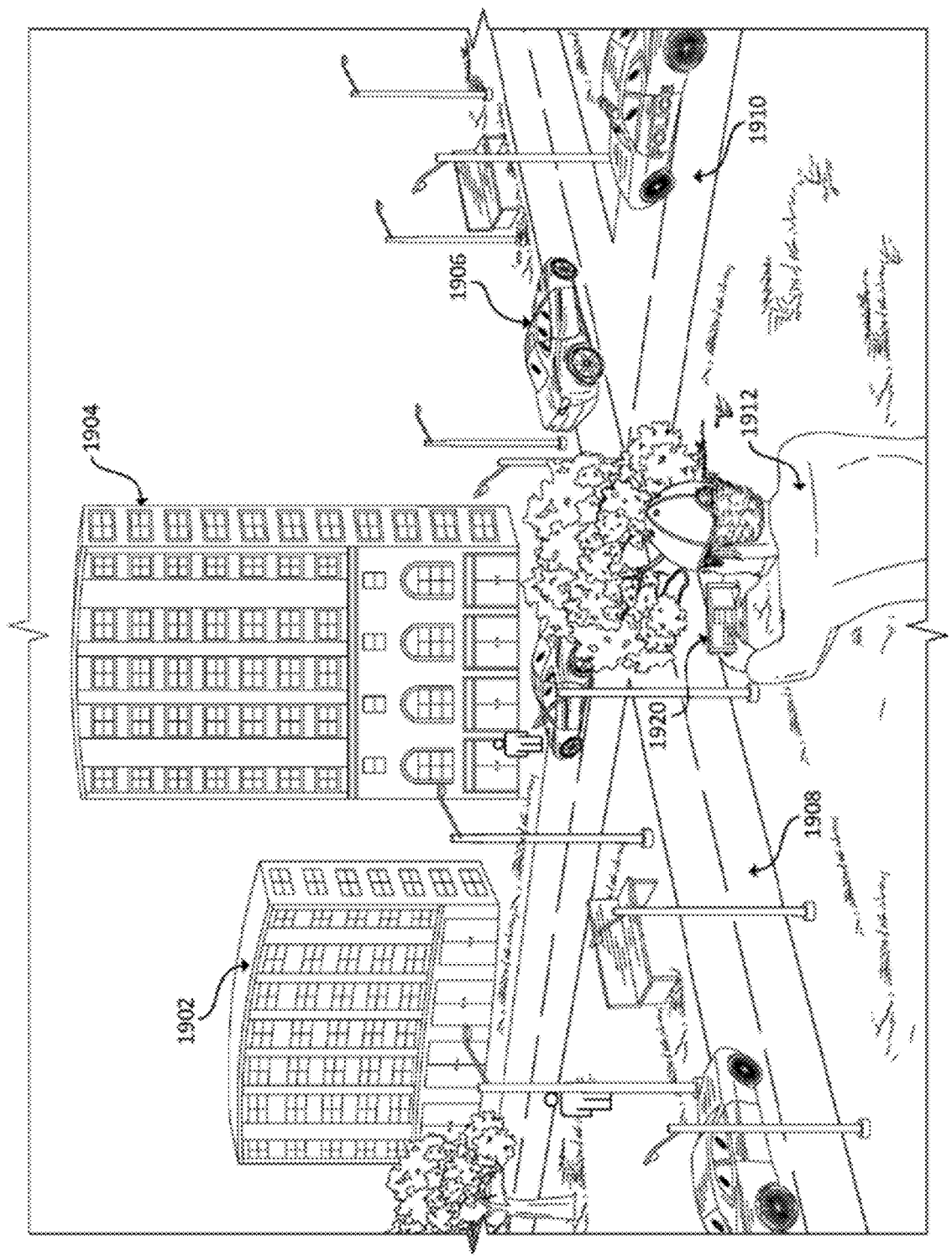
FIG. 3A illustrates an example emergency environment in accordance with embodiments of the technology disclose herein.

FIG. 3A depicts an example emergency responder 1912 utilizing the presently disclosed technology in an example environment in which the presently disclosed technology may be implemented. As shown, emergency responder 1912 is holding up his emergency responder terminal 1920 to capture a portion of the real-world scene he is within (the camera component of emergency responder terminal 1920 being pointed in the direction of the portion of the real-world scene the emergency responder desires to capture). Here, the portion of the real-world scene may be a city block intersection that includes, for example, buildings 1902, 1904, automobiles 1906, 1907, city streets 1908, 1910, city benches 1914, street lighting, plant life, pedestrians (which may or may not be other registered users), etc.

Figure 3B:
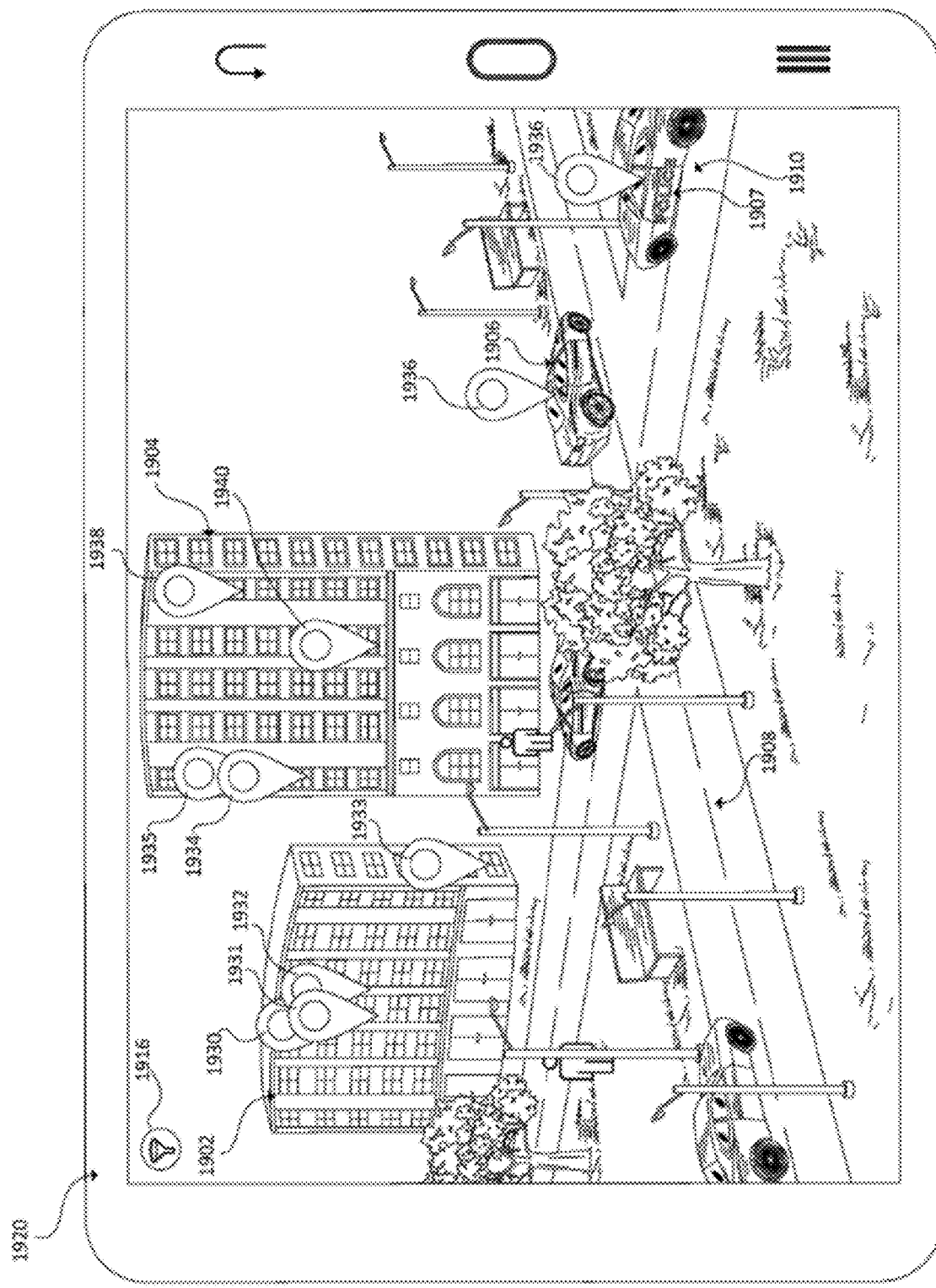
FIG. 3B illustrates an example augmented reality display of the example emergency environment of FIG. 3A in accordance with embodiments of the technology disclose herein.

FIG. 3B illustrates an example augmented reality presentation that may be displayed on the emergency responder 1912's emergency responder terminal 1920 of FIG. 3A. As shown, the presentation may include one or more augmented reality display objects corresponding to registered user locations (e.g., target location display objects 1930, 1931, 1932, 1934, 1935, 1936, 1940; emergency responder location display object 1937) in accordance with one or more embodiments of the present disclosure. That is, display objects 1930-1940 are provided as an augmented reality overlay to indicate where in the real-world scene other registered users within the scene being captured are located. Because user location component 208 of ERS 100 may determine users' altitude as well as longitudinal and latitudinal coordinates, display objects 1930-1940 may be positioned to reflect both horizontal and vertical displacement as between the emergency responder terminal 1920 and the other terminals within the real-world scene being captured. In some embodiments, the display objects may show horizontal distance, vertical distance, or other information as part of the display object itself (shown in FIG. 4). In some embodiments, a visual feature (e.g., size, color, shape, etc.) of a display object may be used to convey relative distance information about user locations relative to the given emergency responder's location. For example, although not shown in FIGS. 3A-3G for simplicity, display objects associated with user terminals whose location is further from the emergency responder's terminal than others may appear to be smaller; and likewise display objects associated with user terminals whose location is closer to the emergency responder terminal than others may appear to be bigger. Thus, in some embodiments the size (or other visual feature) of a display object being displayed on an emergency responder's terminal may be displayed having a size that is a function of the distance between the terminal associated with the display object and the emergency responder's terminal (shown in FIG. 4). In some embodiments, display objects may be selectable to drill down into other information about the user (e.g., location details, registered user data), and/or options associated with the given user, as illustrated in FIG. 3C.

Figure 3C:
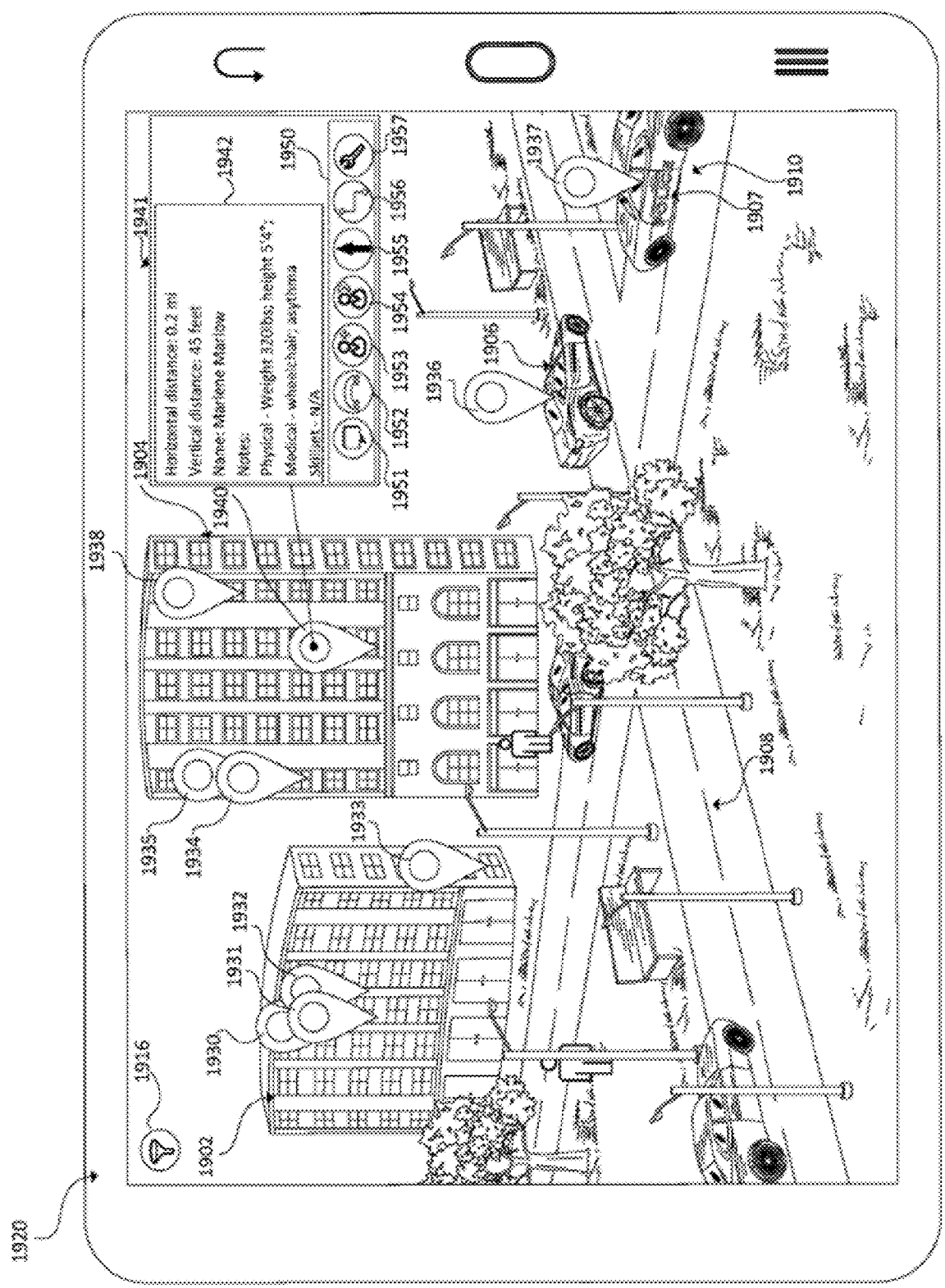
FIG. 3C illustrates another example augmented reality display with example display objects in accordance with embodiments of the technology disclose herein.

FIG. 3C illustrates example registered user information 1942 and example related options 1950 displayed in an augmented reality presentation similar to that shown in FIG. 3B. The registered user information 1942 and related options 1950 are associated with the user that corresponds to display object 1940 in the presentation. As shown in this example, such registered user information 1942 and related options 1950 may be may be presented in an example pop-up field 1941. In some embodiments, registered user information 1942 and/or related options 1950 may appear in such an example pop-up field 1941 upon user selection, for example, such as the emergency responder 1912 tapping the display object 1940 on the touchscreen display of their emergency responder terminal 1920 to reveal the additional information and options. In some embodiments, registered user information 1942 and/or related options 1950 may appear in such an example pop-up field 1941 upon a mission assignment from an emergency supervisor, for example, such as an emergency supervisor overseeing a team of emergency responders making a selection that issues a command that assigns emergency responder 1912 to be dispatched to aid the registered user associated with display object 1940. Upon the assignment being made, the additional registered user information and other options may be automatically presented. In such embodiments, a supervisor or other manager of a team of emergency responders can quickly and efficiently match and dispatch certain of their emergency responders to go render assistance to certain of the registered users in need of assistance (i.e., individuals with non-responder terminals).

As shown, example registered user information provided in pop-up field 1941 may include the horizontal distance and/or vertical distance from one or more other points in space. In FIG. 3C, as may be seen, there is a horizontal distance of approximately 0.2 miles between the emergency responder 1912's terminal and the non-responder terminal associated with the display object 1940. There is a vertical distance of approximately 45 feet between the emergency responder 1912's terminal and the non-responder terminal associated with the display object 1940.

In some embodiments, the distances presented to the user may reflect different measures. For instance, the point in space from which to compute the vertical distance might be ground level, sea level, the height/altitude of the emergency responder (or other registered user), or any other point as desired for the given application; and the point in space from which to measure the horizontal distance might be the latitudinal and longitudinal coordinates of the emergency responder (or other registered user), or any other point as desired for the given location. In some embodiments, one or more of the distances provided represent the shortest horizontal and shortest vertical distances between the point in space and the location of the registered user in space (e.g., a straight horizontal line between the emergency responder 1912's location and the individual's location (represented by display object 1940). In some embodiments, one or more of the distances provided may represent the horizontal and/or vertical distance that would need to be traversed to follow a recommended route between the two points (such a route is shown and discussed in more detail with respect to FIG. 3D). In some embodiments, a distance measure provided may be a line-of-sight distance (that is, the length of the hypotenuse that is opposite the right angle formed between a straight line representing the shortest horizontal distance and straight line representing the shortest vertical distance line).

In some embodiments, the system may provide a route distance if route information can be obtained (e.g., via a maps application, based on building structure information, etc.), and alternatively a shortest horizontal and/or shortest vertical distance and/or a line-of-sight distance if no route information can be obtained (or the route information is inadequate or unselected). One of ordinary skill in the art will appreciate that any one or more units of distance measure (e.g., feet, meters, inches, yards, miles, kilometers, etc.) may be used in connection with the present disclosure.

As further shown in pop-up field 1941, registered user information may include, by way of example and not by way of limitation, the user's name, physical characteristics, medical or health conditions, skillsets, or any other information obtained by or accessible to ERS 100. This information may be helpful for an emergency responder (or the emergency responder's supervisor) to better understand how to help the person in need, and/or to more appropriately dispatch emergency responders to the aid of a given person. For example, the registered user associated with display object 1940 in FIG. 3C, named Marlene Marlow, is registered as being 5'4" tall and 320 pounds, and has medical conditions including asthma and a condition that constrains her to a wheelchair. Thus, the emergency responder 1912 may take extra steps to prepare to help Marlene.

These extra steps may include, by way of example and not by way of limitation, texting or calling Marlene to establish contact and/or to determine if Marlene's wheelchair is operable and/or if she has knowledge of an accessible wheelchair ramp in the building, for example (e.g., by pressing icon 1951 for texting, or by pressing icon 1952 for voice or video calling, etc.). These extra steps may include summoning another emergency responder for additional help, for example, if the emergency responder 1912 recognizes that more than one person will be required to lift Marlene out of the building (e.g., by pressing icon 1953 to summon another nearby emergency responder, or other registered user with a skillset that could be employed to assist Marlene). These extra steps may include transmitting a request to re-assign the mission to assist Marlene to another emergency responder with a different skillset (assuming the emergency responder was assigned the mission in the first place). For instance, emergency responder 1912 may not have any equipment (such as an inhaler) to help a person having an asthma attack (assuming this were the case), and may press icon 1954 to request a reassignment of the mission to another emergency responder that does have such equipment. Such requests may be pre-programmed and/or selectable from a menu, or may be customized messages sent through in-app messaging or SMS messaging between emergency responders. In some embodiments, certain registered user information and/or options may be displayed as part of the original display object itself such that the user need not select anything to see such certain registered user information about a particular user. Such certain information may include any information desired that is accessible to or stored by ERS 100.

Figure 3D:
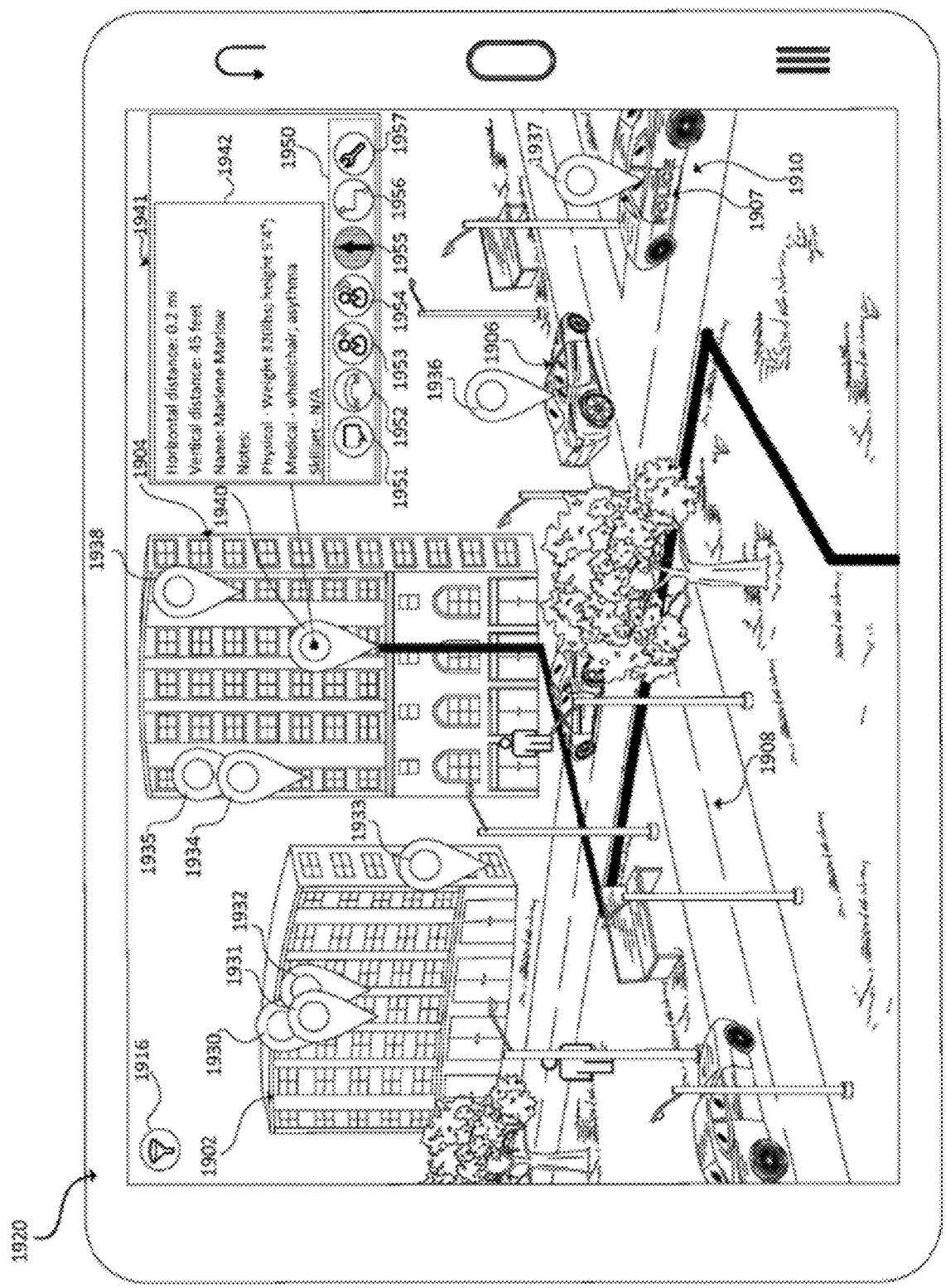
FIG. 3D illustrates another example augmented reality display with example route information in accordance with embodiments of the technology disclose herein.

In some embodiments, an emergency responder 1912 may be provided with route information providing a route path to arrive at the location of the individual. Such route information may be in the form of a list of directions, or a graphic representation of the route path. For example, the emergency responder 1912 in the present example may press button 1955 to show a graphical representation of a route path between the emergency responder and the individual as shown in FIG. 3D. As shown in FIG. 3D, the route path 1965 may be displayed in the presentation to show the path the emergency responder may follow to arrive at the location of the individual. FIG. 3D shows icon 1955 shaded to reflect that it has been selected. The route path may dynamically adjust as the location of either the emergency responder or the location of the individual changes (based on the location of their respective terminals). The route path may dynamically adjust to reflect new information obtained by ERS 100 about possible routes. For example, ERS 100 may receive an indication from a first emergency responder that a particular stairwell is blocked by an active fire, so the only other route is to access the upper floors is by the fire-escape ladder on the east side of the building. Accordingly, ERS 100 may route or re-route and display a new route path that reflects the updated information and informs the emergency responder that they must proceed to a different entry point than might otherwise be expected.

Although not shown in the augmented reality presentation of FIG. 3D, other information related to the route may be displayed in connection with the route path, such as, for example, an estimated time of arrival (based on average walking/running speeds, based on the particular emergency responder's walking/running speeds), an estimated time within which an emergency responder must arrive (e.g., help NEEDED within 5 minutes) before the situation becomes critical/fatal. The route information may further include mission recommendations such as, run 0.2 miles along path to building, walk to east side of building, climb ladder, break the seventh window you arrive at while climbing the ladder, proceed into the building with caution, press icon to activate an alarm on the individual's terminal, proceed to sound, and so on. Such mission recommendations may be based on one or more of (i) the time within which an emergency responder must arrive to render adequate care, (ii) the given emergency responder's location relative to the individual's location, (iii) the route path, (iv) the emergency responder's physical capabilities (based on historical trends, inputs from the emergency responder, etc.), (v) the tools the emergency responder has with them, (vi) the building structure as known to ERS 100, (vii) feedback from other emergency responders providing updates about the building, compromised routes of travel, or feedback about the emergency situation generally.

Figure 3E:
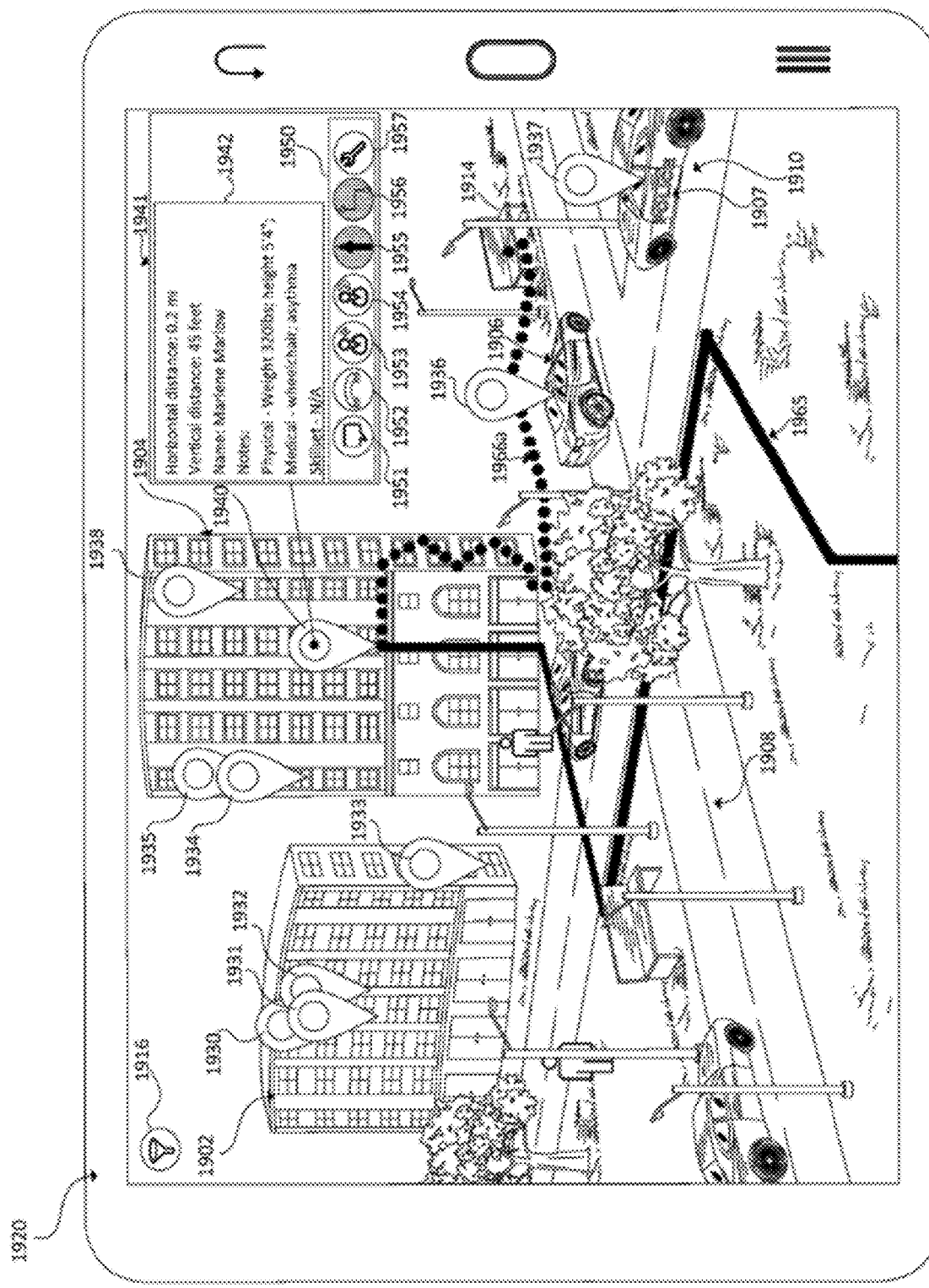
FIG. 3E illustrates another example augmented reality display with example user path information for one user in accordance with embodiments of the technology disclose herein.

In some embodiments, an emergency responder 1912 may be provided with user path (e.g., target path) information providing a user path, or a portion of a user path, that led them to their current location. Such information may be useful to identify how a particular user arrived at their current location, such information further being useful to identify a possible path to follow to get to the target location, to identify users that may have caused or seen what caused some action that gave rise to the emergency situation, among other information. Such user path information may be shown as a graphic delineating a path. For example, after pressing display object 1940, emergency responder 1912 may press button 1956 to show a graphical representation of the user path 1966a for the target user associated with the display object 1940. As shown, user path 1966a in the example provided in FIG. 3E is shown by a series of black dots that convey the user's path. Although not shown in FIG. 3E, some graphical representations of a user path may indicate the direction of the user's travel. For a non-limiting example, considering FIG. 3E, if the user associated with display object 1940 traveled from the bench 1914 to the second floor of building 1904, the dots between the bench 1914 and the building 1904 may include an arrow or other pointer pointing substantially in a leftward direction. As shown in FIG. 3E, the user path 1966 may be displayed in the presentation to show the path a given target travelled to arrive at their current location. FIG. 3E shows icon 1956 shaded to reflect that it has been selected.

Figure 3F:
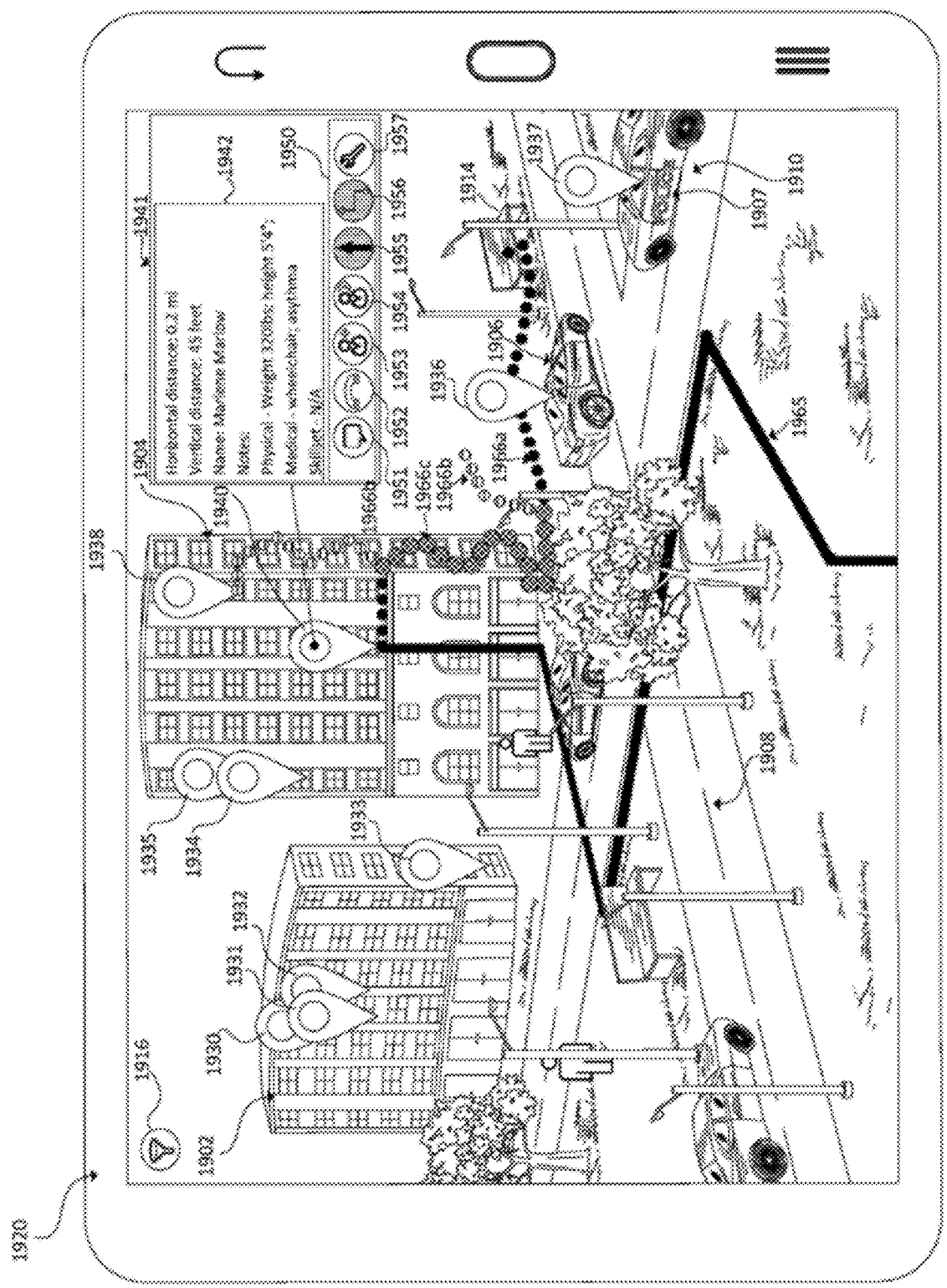
FIG. 3F illustrates another example augmented reality display with example user path information for multiple users in accordance with embodiments of the technology disclose herein.

In some embodiments, as shown by way of example in FIG. 3F, multiple user paths for multiple users may be displayed in the same presentation. For instance, in addition to user path 1966a (denoted by black dots), the presentation may further show user path 1966b (denoted by dots having a horizontal line pattern) that shows the path that the user associated with display object 1938 followed to arrive at their current location. In some such embodiments, one or more user paths may partially or entirely overlap. In some such embodiments, the graphical representation provided for the overlapping portion of multiple users' paths may be adjusted to exhibit a visual feature denoting an increased density of individuals traveling along the same path (e.g., to denote a heavily traveled path). For example, instead of showing multiple lines of dots on top of one another or immediately next to one another, a single line of dots may be shown as larger dots in areas of overlap. That is, the size of the graphical representation used to denote user paths may be adjusted to reflect increased or decrease traffic along such paths, or portions of such paths. In some instances, the areas of overlap are distinguished by visual features other than, or in addition to, size. For instance, as shown in FIG.

3F, the portion of the user paths that overlap is denoted with dots having a checker pattern fill rather than a solid fill (as user path 1966*a*) or a horizontal line pattern fill (as user path 1966*b*).

As one of ordinary skill in the art will appreciate upon review of the instant disclosure, any graphical representation desired maybe use to delineate a user path or a route path. The dots and lines used in FIGS. 3D-3G are in no way intended to be limiting, but instead are merely used as illustrative aids to help describe example implementations of the technology presented in the instant disclosure.

Figure 3G:
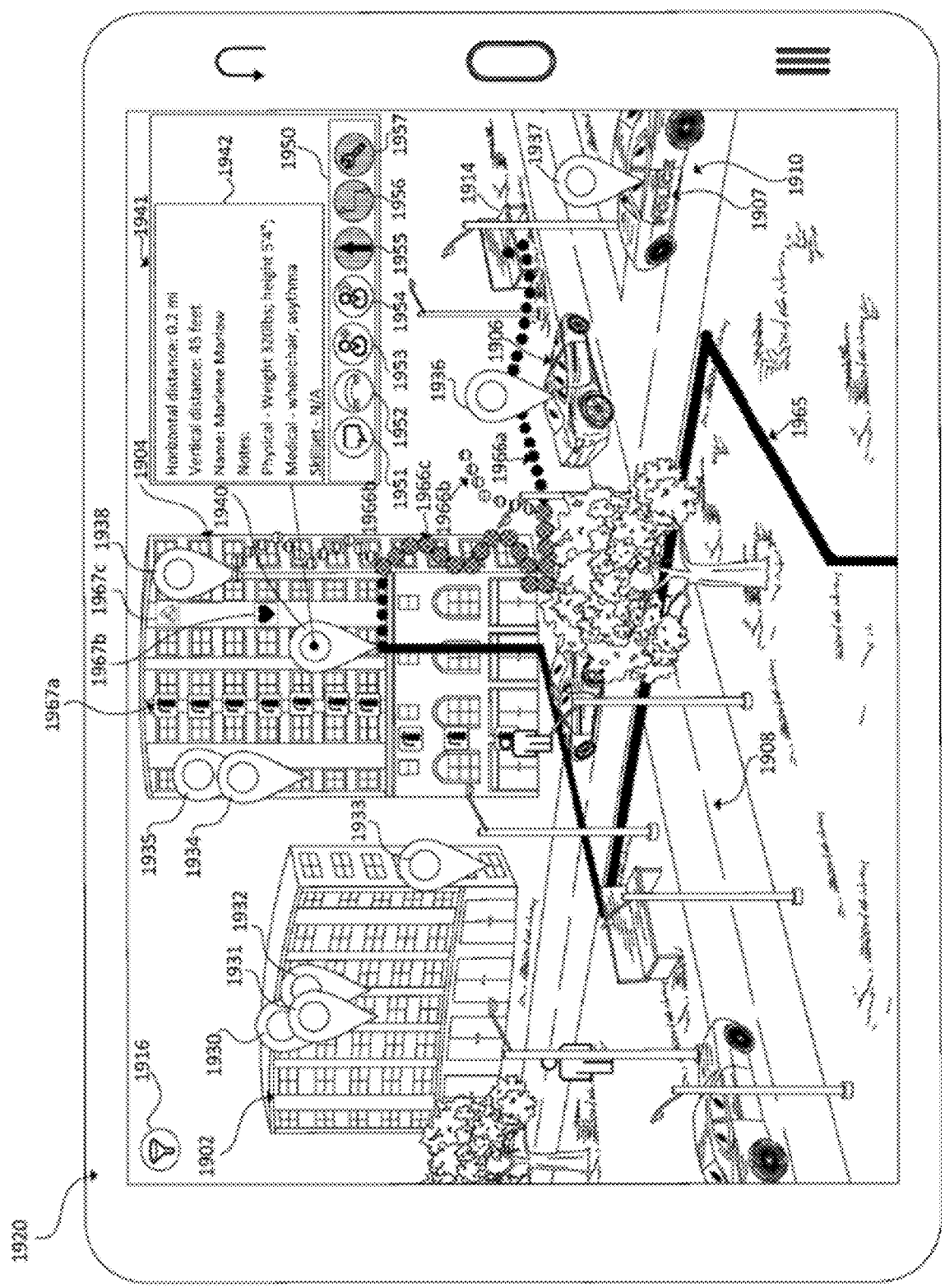
FIG. 3G illustrates another example augmented reality display with example equipment locations displayed in accordance with embodiments of the technology disclose herein.

FIG. 3G illustrates the example augmented reality presentation shown in FIG. 3E, here further showing example equipment locations in accordance with one or more embodiments of the present disclosure. As noted, in some embodiments, ERS 100 may obtain location information of one or more pieces of equipment within (or associated with) the zone of interest (i.e., the field of view), and may further provide such location information of one or more pieces of equipment to the one or more emergency responder terminals and/or present augmented reality display objects on the display of such emergency responder terminals (similar to the augmented reality display objects discussed above with respect to registered users and target terminals). Such equipment may include a fire extinguisher, an epinephrine pen (EpiPen), an axe, an oxygen mask, a defibrillator, a hose, a mask (e.g., an oxygen mask, an antimicrobial mask), a fire alarm, a fire hydrant, a hose, a rope, etc. For example, as shown in the example illustration in FIG. 3F, display objects (represented collectively by numeral 1967*a*) corresponding to fire extinguishers are presented as augmented reality overlays atop the presented image in locations where one or more pieces of equipment exist within the real-world scene being presented. In another example, as shown, display object 1967*b* corresponding to a defibrillator is presented as augmented reality overlays atop the presented image in a location where such defibrillator exists within the real-world scene being presented. In another non-limiting example, as shown, display object 1967*c* corresponding to a package of antimicrobial masks is presented as an augmented reality overlay atop the presented image in a location where such package of antimicrobial masks exists within the real-world scene being presented (here, on the top floor of building 1904). One of ordinary skill in the art will appreciate that any display object desired may be presented to correspond to a location of any piece of equipment relevant to a particular emergency situation. Different buildings may have different equipment. Thus, in different implementations of ERS 100, different icons may be associated with such equipment and presented as augmented reality overlays as a user (e.g., emergency responder 1912) views a portion of a scene as captured via the camera component of their terminal. In some embodiments, equipment locations may appear within the augmented reality presentation upon user selection, for example, a user's selection of equipment icon 1957 shown in related options field 1950.

It should be noted here that the various features discussed herein with reference to emergency management application features available in connection with non-responder terminals and associated users may also be implemented, in some embodiments, in connection with non-terminal identification components and associated units of equipment. The components discussed above (or additional analogous components) may be further configured to extend their features to units of equipment just as they do to users.

For example, display object component 212 (or similar component) may be configured to define display objects associated with units of equipment whose location data has been obtained by ERS 100 via one or more system resources 200. Such display objects may include any graphic (e.g., a pin, a bubble, a tile, an icon, or the like) that may be displayed on an electronic display of a terminal. A display object component such as display object component 212 may determine when a portion of a real-world scene captured by a camera component 210 of an emergency responder terminal 110 captures a region of space wherein a unit of equipment, a non-responder terminal 120, and/or other emergency responder terminals 110 are located. As one or more portions of the real-world scene captured is provided on the display of the emergency responder terminal 110 (e.g., as a user scans the camera over a scene), such display object component may cause the display objects corresponding to units of equipment (additionally with or alternatively to the display objects corresponding to non-responder terminals 120 and/or other emergency responder terminals 110) falling within the scene to be displayed such that they overlay the real-world scene images in a manner (e.g., on a region of the image) that identifies the location of respective units of equipment within the real-world scene as it is displayed on the display of the given emergency responder terminal 110.

In another example, registered user detail component 214 (or similar component such as other component 228 called an equipment detail component, for example) may be configured to: obtain and/or store information about a unit of equipment. Such a component may obtain such information either via manual input from a user into an equipment profile that may be stored in storage 206, or by polling for such information from a communications resource of a non-terminal identification component coupled to the unit of equipment and in operative communication with ERS 100, for example. Such information may include equipment details such as a name or type of the unit of equipment (e.g., defibrillator, EpiPen), a quantity of units of equipment being referenced (e.g., 25 oxygen masks available), a status of the unit(s) of equipment being referenced (e.g., Hose is currently inoperable, EpiPen already discharged, only 30% battery remaining in defibrillator, 2 hours of flashlight life left, etc.), an instruction or link leading to an instruction regarding how to use the equipment, a warning or caution regarding the equipment (e.g., "For use only by medical professionals," "do not touch the red button on the back side of the unit," etc.), or any other details about the equipment as may be desired. Any and all such equipment detail information may be stored in any electronic storage available to ERS 100, such as in an equipment data 234 sector of storage 206 of FIG. 2.

In still a further example, mission route component 222 (or similar component) may be configured to: determine one or more routes providing possible paths of travel that an emergency responder may follow in order to reach a given (or selected) unit of equipment. Mission route component 222 may draw upon map information stored within ERS 100 (e.g., within storage 206) or otherwise accessible to ERS 100 (e.g., via a map database accessible online, via information communicated via a non-terminal identification component) to determine and/or provide a route upon which the emergency responder may travel to reach the unit of equipment. Such map information may be based on building information (e.g., stairwell locations, elevator bays, escalators), online map information (e.g., google maps information), and information from one or more of the emergency vicinity components. The route provided may be a walking route, driving route, bicycle route, or any route suitable for any mode of travel (escalator route, elevator route, etc.) or any combination of the foregoing. The determined route or routes may be displayed as an overlay on a portion of a real-world scene captured by a camera component 210 of an emergency responder terminal, or may be provided as a list of visual instructions, a list of audio instructions, or in any other format or manner desired. In some embodiments, multiple routes are determined and provided to an emergency responder via the emergency responder's emergency responder terminal 110.

Figure 4:
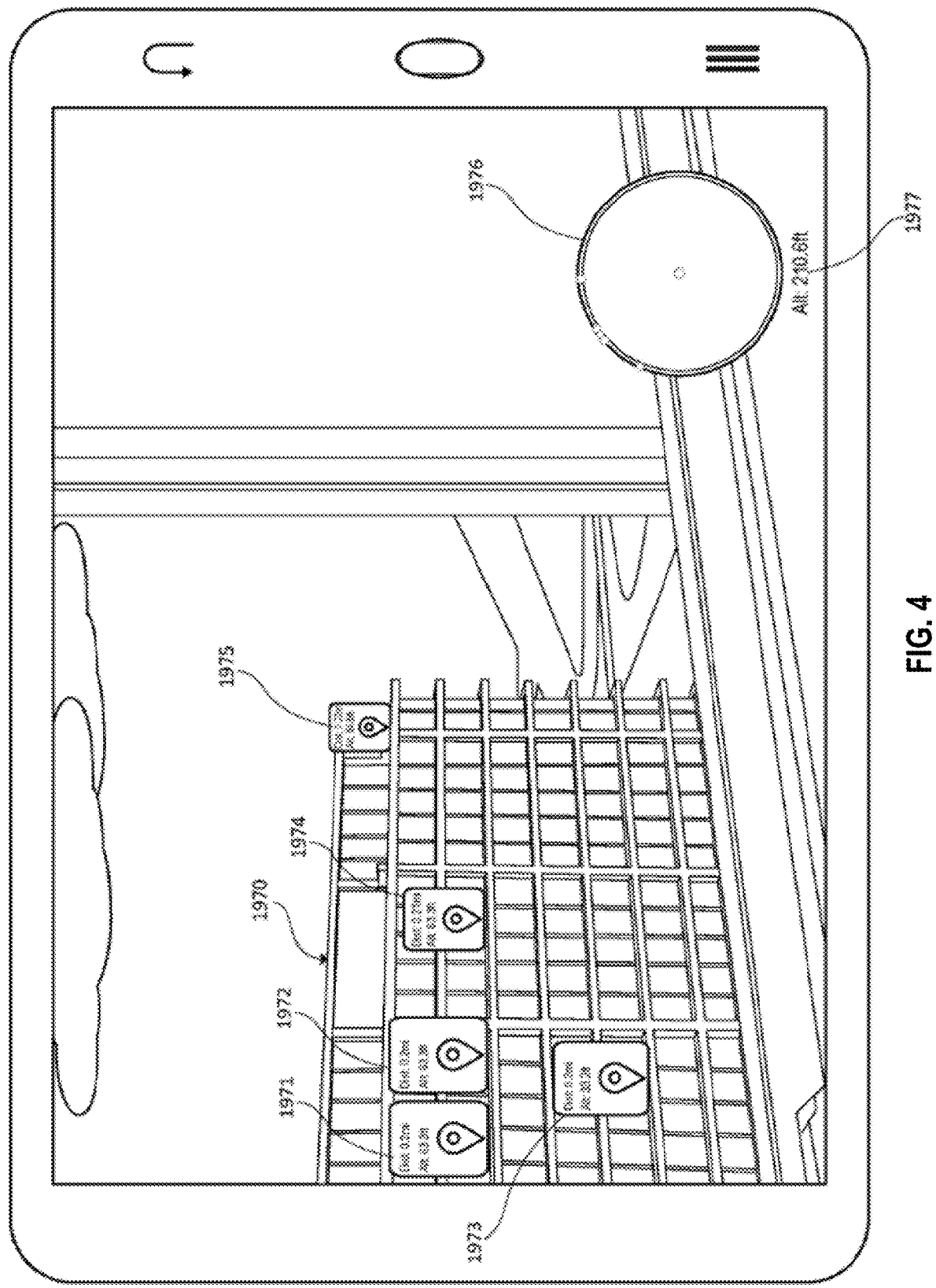
FIG. 4 illustrates another example augmented reality display in accordance with embodiments of the technology disclose herein.

FIG. 4 illustrates another example augmented reality presentation that may be displayed on an emergency responder's emergency responder terminal in accordance with embodiments of the present disclosure. The presentation may include display objects associated with users in different locations within building 1970. As shown, the display objects themselves may include one or more details about the registered users associated with them. For example, display objects 1971-1975 may include a distance measure and an altitude measure for individual users. Additionally, the size of the display objects may be keyed to the distance measure. For instance, the user associated with display object 1971 is 0.20 miles from the emergency responder holding the terminal shown, and the user associated with display object 1975 is 0.22 miles from the emergency responder holding the terminal shown. Since the user associated with display object 1971 is closer to the emergency responder holding the terminal shown than the user associated with display object 1975, display object 1971 is larger than display object 1975. Thus, the augmented reality display objects may exhibit a visual feature that provides depth cues to indicate to the emergency responder how close a given user is relative to other users (i.e., user associated with display object 1971 is closer than user associated with display object 1975). Similar visual features may be employed with respect to display objects associated with equipment. Further as shown in FIG. 4, the presentation may include a compass indication display object 1976 and/or altitude indication 1977 based on the position and/or orientation of the terminal shown.

Figure 5:
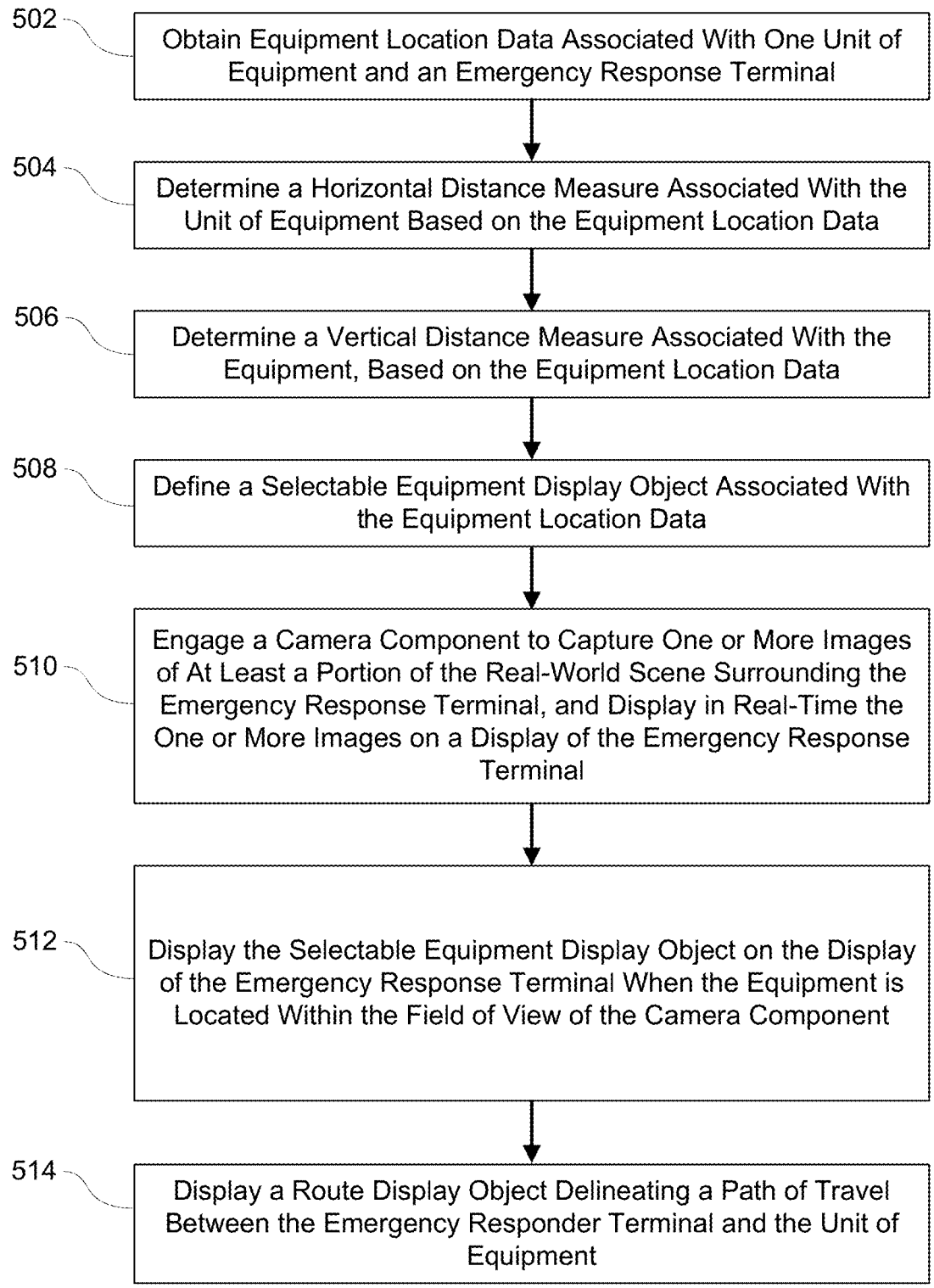
FIG. 5 illustrates an example method in accordance with embodiments of the technology disclosed herein.

FIG. 5 is a flow diagram illustrating an example method 500 that may be implemented by ERS 100 in accordance with embodiments of the present disclosure. At operation 502, equipment location data associated with one unit of equipment and an emergency response terminal is obtained. In various embodiments, the equipment location data and emergency response terminal location data may be obtained through local location hardware of emergency responder terminals, non-responder terminals, and/or non-terminal identification components, like discussed with respect to FIGS. 1-3G. In some embodiments, the equipment location data may be pre-associated with one or more non-terminal identification components, and obtaining the equipment location data may comprise retrieving the pre-associated equipment location data from a storage component of an EME, emergency responder terminal, and/or non-responder terminal. The location data of emergency response terminal may be data obtained by local location hardware of the emergency response terminal, location data of one or more non-terminal components, or a combination thereof, like discussed above with respect to FIGS. 1-3G.

At operation 504, a horizontal distance measure associated with the unit of equipment based on the equipment location data is determined. The horizontal distance measure may be determined with respect to the emergency response terminal. In various embodiments, the horizontal distance measure may be determined by comparing the equipment location data and the emergency response terminal location data. In various embodiments, the horizontal distance measure may be displayed in one or more units of length (e.g., feet, meters, etc.). At operation 506, a vertical distance measure associated with the equipment, based on the equipment location data is determined. The vertical distance measure may be determined with respect to a reference level. In various embodiments, the reference level may be sea level, ground level, the height/altitude of the emergency responder terminal (or other registered user), or any other reference value as desired for the given application.

At operation 508, a selectable equipment display object associated with the equipment location data is defined. Defining a selectable equipment display object may comprise associated with a display object one or more characteristics data of the equipment. In various embodiments, the characteristic data may include the horizontal distance measure and/or vertical distance measure determined at operations 504 and 506, respectively. Non-limiting examples of characteristic data includes: equipment type; operational status of the equipment; notes or other comments associated with the equipment; among others. In various embodiments, defining the selectable equipment display object may comprise selecting a display object that visually identifies the equipment. For a non-limiting example, the equipment may be a fire extinguisher and defining the selectable equipment display may comprise associating a fire extinguisher icon as the selectable equipment display object.

At operation 510, a camera component to capture one or more images of at least a portion of the real-world scene surrounding the emergency response terminal may be engaged, and display in real-time the one or more images on a display of the emergency response terminal. In various embodiments, as the camera component moves or scans a scene, the real-time display updates to display the new portion of the scene captured by the camera component.

At operation 512, the selectable equipment display object is displayed on the display of the emergency response terminal when the equipment is located within the field of view of the camera component. The selectable equipment display object identifies the location of the equipment with respect to the emergency responder terminal. As the camera component scans or moves through a scene, the selectable equipment display object is displayed as long as the field of view of the camera component captures a portion of the scene in which the equipment is present. In various embodiments, the size of the selectable equipment display object may vary depending on the horizontal and/or vertical distance between the equipment and the emergency responder terminal.

At operation 514, a route display object delineating a path of travel between the emergency responder terminal and the unit of equipment is displayed on the display. The route display object may be a visual representation of a route from the emergency responder terminal and the equipment, similar to the mission assignment component and mission route component discussed with respect to FIG. 2.

Although discussed with respect to the emergency responder terminal, the method 500 may be implemented from the perspective of a non-responder terminal. In various embodiments, where method 500 is executed by a non-responder terminal, the route display object may visibly display a route for the individual to reach the equipment. In this way, a non-respondent terminal may be try to address an emergency (e.g., using a fire extinguisher on a fire).

Figure 6:
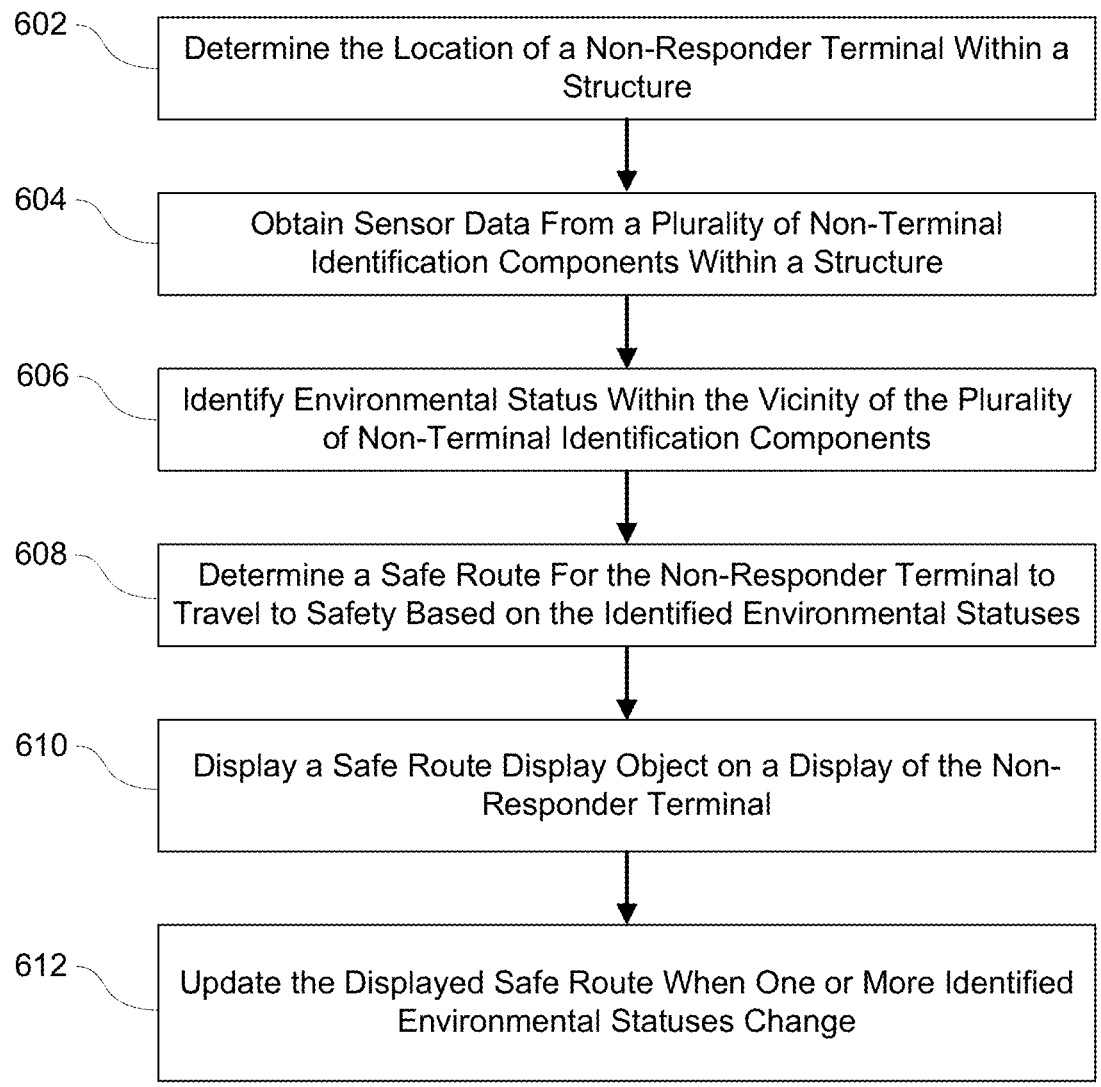
FIG. 6 illustrates another example method in accordance with embodiments of the technology disclosed herein.

In some embodiments, there may be a safe path over which an individual may can move away from the vicinity of an emergency. FIG. 6 a flow diagram illustrating an example method 600 that may be implemented by ERS 100 in accordance with embodiments of the present disclosure. Although discussed with respect to providing a safe path through a structure (e.g., an office building), a person of ordinary skill in the art would understand that method 600 is applicable in other environments implementing ERS 100.

At operation 602, the location of a non-responder terminal within a structure is determined. In various embodiments, location data for determining the location may be obtained in a similar manner as operation 502 discussed with respect to FIG. 5, and the user location component 208 discussed with respect to FIG. 2. In various embodiments, the ERS may determine the non-responder terminal's location based on the location data obtained from local hardware of the non-responder terminal, from one or more non-terminal identification components in the vicinity of the non-responder terminal, from a storage component of the ERS, or a combination thereof. The determination may be similar to the determination discussed above with respect to FIGS. 1-4.

At operation 604, sensor data from a plurality of non-terminal identification components within the structure is obtained. As discussed with respect to FIGS. 1 and 2, the non-terminal identification components may include one or more sensor components for collecting data indicative of the environment within the vicinity of the non-terminal identification components. In various embodiments, the data collected by the sensor components may be transmitted to the EME and/or the non-responder terminal over a network. In some embodiments, the data collected by the sensor components may be transmitted to the non-responder terminal, and the non-responder terminal may exchange the collected data with the EME for processing and/or storage.

At operation 606, an environmental status within the vicinity of the plurality of non-terminal identification components is identified. The identification is based on the data collected by the sensor components at operation 604. In various embodiments, the data is collected from the sensor components in real-time or near real-time. The environmental status is a measure of how safe it is around each of the non-terminal identification components. As a non-limiting example, a non-terminal identification component may detect heat (through a heat sensor) and smoke (through a smoke detector and/or image sensor). At operation 606, the one or more processors of the ERS may analyze the heat and smoke data and determine that a fire is located in the vicinity of the respective non-terminal identification component. Such analysis may include identifying the increased heat based on the received heat sensor data and associating the detected smoke from the received image sensor, thereby indicating a fire. As another non-limiting example, a non-terminal identification component may detect loud bangs through an audio sensor. The one or more processor of the ERS may analyze the bangs and determine that the sounds correspond to gunfire. This analysis may include analyzing the acoustic characteristics (e.g., amplitude, frequency, decibels, etc.) of the bangs and comparing those characteristics with threshold values associated with gunfire, the threshold values may be stored in a memory component of the ERS.

After determining one or more environmental statuses associated with each of the non-terminal identification components within the structure, at operation 608 a safe route for the non-responder terminal to travel safely is determined, based on the identified environmental statuses. Where the non-terminal identification components are installed throughout the structure, the identified environmental statuses provide the ERS with a holistic view of some or all of the structure. Using this information, the ERS in various embodiments may identify safe areas where the user of the non-responder terminal can go without high risk of danger and enable egress from the structure. In various embodiments, safe areas may be identified based on the location data of the respective non-terminal identification component and the ERS may associate route display objects to those locations.

At operation 610, a safe route display object is displayed on the display on the non-responder terminal. The safe route display object may be similar to the route display object and mission route component discussed with respect to FIGS. 1-3G and 5. At operation 612, the safe route display object is updated when one or more identified environmental statuses change. In various embodiments, sensor data from the plurality of non-terminal identification components may continually be obtained in real-time or near real-time. The ERS may be configured to analyze the continually obtained data to identify if one or more of the environmental statuses previously identified have changed. Where the change in environmental status requires a change in the safe route, the ERS can determine one or more changes to the displayed safe route and update the display to provide the updated safe route to the user of the non-responder terminal. In various embodiments, the safe route may need to be updated where one or more areas within the vicinity of non-terminal identification components has become more dangerous (e.g., fire is detected in the area).

The methods discussed with respect to FIGS. 5 and 6 may be executed by one or more processors of ERS 100. In some embodiments, one or more processors of the EME 130 and one or more processors of a terminal (either a non-responder terminal 120 or an emergency responder terminal 110) may cooperate to executed the operations of methods 500 and 600, while in other embodiments either the EME 130, emergency responder terminal 110, or the non-responder terminal 120 may perform methods 500 and 600. Machine-readable instructions comprising one or more sub-instructions of each operation of the methods 500 and 600 may be stored on one or more non-transitory storage and/or memory components of the ERS resources.

In some situations, there may be individuals present during an emergency who are not associated with the ERS. In such situations, the individual may not be identified in the same manner as registered users with a non-responder terminal. In various embodiments in accordance with the technology disclosed herein, such non-registered users may be detected through one or more signal scanner components of an emergency responder terminal, a non-responder terminal, and/or a non-terminal identification component.

Figure 7:
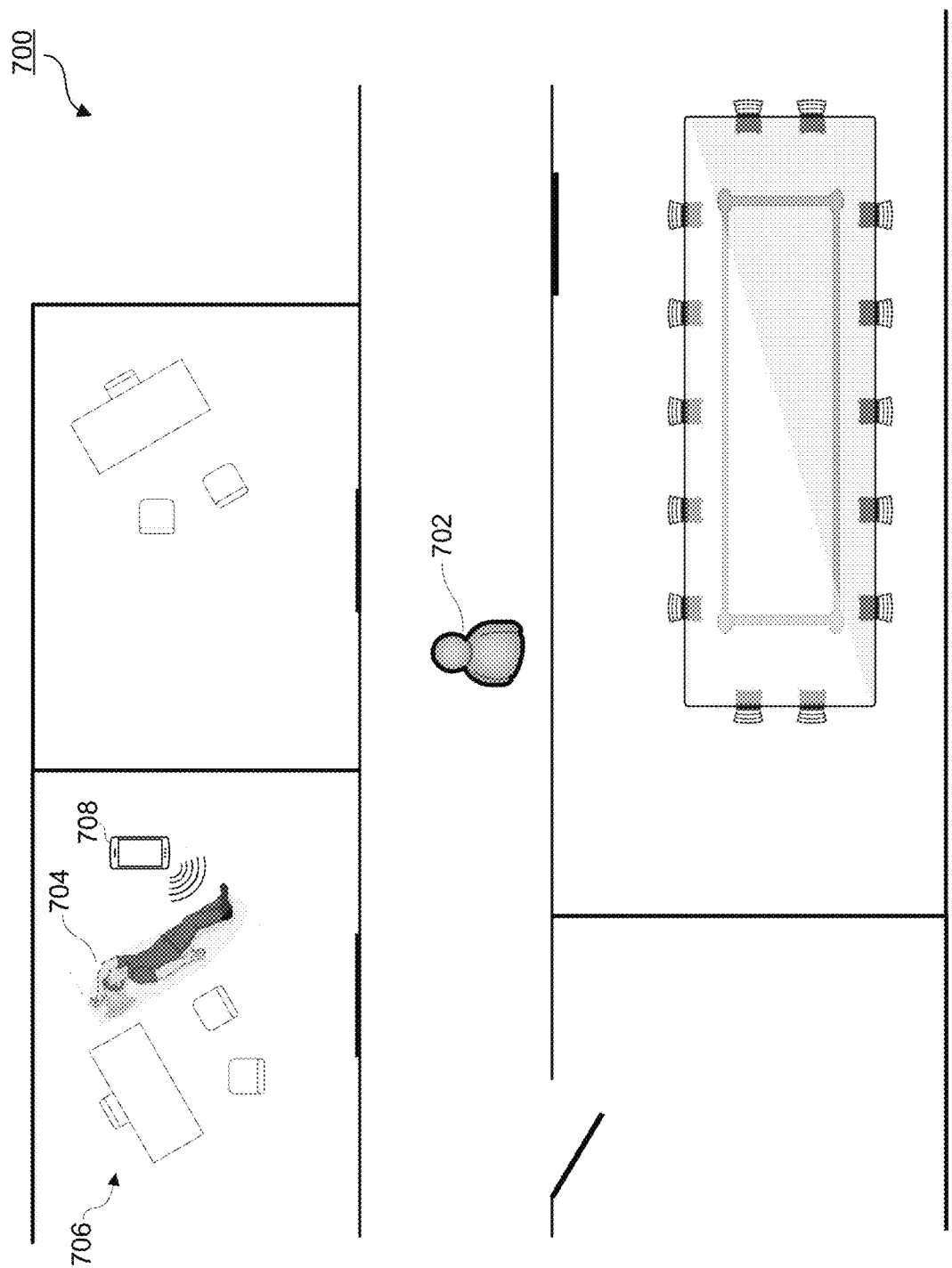
FIG. 7 illustrates an example environment of an emergency responder terminal identifying a signal from an unregistered device in accordance with embodiments of the technology disclosed herein.

FIG. 7 illustrates an example environment 700 of an emergency responder terminal identifying a signal from an unregistered device in accordance with embodiments of the present disclosure. For ease of discussion, the example environment 700 does not show other components, such as non-responder terminals and/or non-terminal identification components discussed with respect to FIGS. 1-6. Although not shown, a person of ordinary skill in the art would know that the scenario illustrated in FIG. 7 is applicable where such components are present. Nothing in this disclosure should be interpreted as limiting the scope of the subject matter disclosed with respect to FIG. 7.

As shown in FIG. 7, an emergency responder 702 is walking down a corridor in a building. In various embodiments, the emergency responder 702 may be a firefighter responding to a fire in the building. In such emergencies, visibility may be reduced due to the smoke given off by the fire. As the emergency responder 702 walks down the corridor, an emergency responder terminal associated with the emergency responder 702 may receive an augmented reality representation of ERS-associated devices as discussed above with respect to FIGS. 1-6. However, the emergency responder 702 may not be able to identify the individual 704 because the individual 704 is located within the office 706. The emergency responder's 702 field of view is obstructed by the wall and door of the office. Relying on the ERS and line of sight, the emergency responder 702 would not know that the individual 704 is in need of assistance without entering each and every room.

In various embodiments, the emergency responder terminal associated with the emergency responder 702 may scan the area for one or more types of propagated signals commonly associated with mobile devices a person tends to carry with them. Such propagated signals may include mobile modem signals. Non-limiting examples of mobile modem signal include: 3G; 4G; 5G; LTE; UMTS; EDGE; GPRS; EV-CO; 1×RTT; GSM/HSPA+; CDMA; radio transmissions within the consumer spectrum; among others. As illustrated in the example environment 700, the individual 704 has a mobile device 708, which may be on the individual's 704 person during the emergency. The emergency response terminal of the emergency responder 702 may include hardware capable of detecting the cellular signal of the mobile device 708. In various embodiments, the emergency responder terminal of the emergency responder 702 may include one or more antenna configured to capture one or more propagated signals, such as the propagated signals discussed above.

In various embodiments the emergency response terminal of the emergency responder 702 may generate a generic display object indicating the position of the mobile device 708 and display the generic display object in a manner similar to displaying a display object as discussed with respect to FIGS. 1-6. The generic display object may be an overlay on the captured real-world scene of a camera component of the emergency responder's 702 terminal. In some embodiments, the generic display object may be created and displayed by an EME, the emergency responder terminal of the emergency responder 702, or a combination of both. As a camera component of the emergency responder terminal of emergency responder 702 spans the scene, the generic display object is displayed in a manner similar to displaying display objects discussed with respect to FIGS. 1-6 (i.e., displayed when the mobile device 708 is within the field of view of the camera component). In various embodiments, the generic display object may be a dedicated icon (e.g., a representation of a signal), while in other embodiments the generic display object may be a selected as an icon different from the icon used to illustrate non-responder terminals and/or equipment or other landmarks associated with a non-terminal identification components.

In various embodiments, the emergency responder terminal may include one or more detector circuits and accompanying machine-readable instructions for extracting modulated information from the captured propagated signal. Extracting information from the captured signal may assist in identifying the type of device propagating the signal, which the emergency responder 702 may use to determine whether it is likely to indicate the presence of an individual. In various embodiments, the emergency responder terminal of the emergency responder 702 may include one or more chipsets designed for use with one or more of the propagated signals discussed above. The information extracted from the captured signal may be associated with the generic display object representing the mobile device 708, providing the emergency responder 702 with additional information regarding the propagated signal. Non-limiting examples of information that may be extracted include: device identification; communication protocol; type of propagated signal; signal strength; among others. In this manner, the emergency responder 702 is alerted to the potential presence of an person in need within room 706 despite the lack of line of sight detection.

In various embodiments, the ERS may be configured to determine whether the source of a propagated signal is a known, registered non-responder terminal. Some non-responder terminals registered with the ERS also emit propagated signals like the propagated signals discussed above. In such situations, it is possible that multiple display objects may be created for the same entity. In various embodiments, the ERS may determine a location of the propagated signal and compare the determined location with an identified location of a non-responder terminal. In various embodiments, the EME or the emergency responder terminal of the emergency responder 702 may compare the location of the detected propagated signal with a location of non-responder terminals within the vicinity. Where the difference between the locations fall within a degree of confidence (e.g., 95% confidence level), the EME or the emergency responder terminal of the emergency responder 702 may determine that the received signal is associated with a non-responder terminal and ignore the detected propagated signal (as the non-responder terminal) would already be displayed on a display associated with the emergency responder terminal). In this way, the ERS may reduce conflicts between the generic display object and the display object associated with the non-responder terminal. In various embodiments, the signal detector and/or other hardware components of the emergency responder terminal, EME, or a combination of both may obtain positional data of the propagated signal using methods know in the art. In some embodiments, the plurality of non-terminal identification components of the ERS may include one or more antenna or other signal capture components to capture the propagated signal, and one or more processors of the ERS may triangulate the position of the propagated signal (e.g., mobile device 708). In various embodiments, the signal strength of the propagated signal may be used to identify a distance away from the emergency responder is the source of the propagated signal, such as varying size based on distance like discussed above with respect to FIGS. 1-6. In other embodiments, the distance may be indicated by changing the color of the generic display object as the emergency responder 702 moves closer or further away from the source of the propagated signal.

In various embodiments, the propagated signal detection function discussed with respect to FIG. 7 can work where the emergency responder terminal has lost connection with the EME or the other components of ERS. As a non-limiting example, the emergency responder terminal of the emergency responder 702 may store one or more machine-readable instructions in non-transitory storage to identify a propagated signal, generate a generic display object, and display the generic display object on a display of the emergency responder 702 when the source of the propagated signal is within the field of view of a camera component. In various embodiments, the emergency responder terminal may be configured to always perform these actions locally, while in other embodiments the emergency responder terminal may be configured to execute the machine-readable instructions when a loss of connection with the network (such as network 150 discussed with respect to FIG. 1) is detected, providing a fallback operation. By facilitating the performance of these actions locally in various embodiments, the technology disclosed herein enables an emergency responder 702 to still identify potential individuals.

In some embodiments, the generic display object may not convey any additional information besides the location of the mobile device 708. In other embodiments, the generic display object may be defined with additional information regarding the mobile device 708 identified through detection of the cellular signal, including but not limited to a device identification, communication protocol, type of propagated signal, among others. In this manner, the emergency responder 702 is alerted to the potential presence of an person in need within room 706 despite the lack of line of sight detection.

The signal detection functionality discussed with respect to FIG. 7 may also identify the location of transmission infrastructure devices. Propagated signals from transmission infrastructure may be detected by one or more antenna or other signal capture devices of an emergency responder terminal. In this way, an emergency responder may be capable of detecting the presence of transmission infrastructure in the vicinity. Non-limiting examples of transmission infrastructure include cellular towers and signal repeaters, among others.

In some embodiments, the emergency responder terminal of the emergency responder 702 may include components for detecting the presence of live electrical wires. One or more signal capture devices of the emergency responder terminal may be configured to detect the electric field generated in an active, live electrical wire. By detecting such signals, the emergency responder 702 can determine whether wires and other electrical conduits in the vicinity are live or are safe to contact.

The functionality discussed with respect to the emergency responder terminal in FIG. 7 may also be implemented within a non-responder terminal. A person of ordinary skill in the art would understand that the subject matter discussed with respect to FIG. 7 is applicable and how to implement such functionality in a non-responder terminal.

Although embodiments of the technology have been discussed with respect to emergency responder terminals as mobile devices, one or more components and/or functionality of the emergency responder terminals discussed with respect to FIGS. 1-6 may be distributed rather than within a single device (e.g., a camera component may be separate from but communicatively coupled to the emergency responder terminal). In some emergency situations, an emergency responder may not be able to hold an emergency responder terminal in his or her hands. For example, holding a mobile device up to scan a scene is not practical for a firefighter searching a building or a police officer in an active shooter situation. To overcome this potential issue, in various embodiments in accordance with the technology disclosed herein one or more functions of the emergency responder terminal discussed with respect to FIGS. 1-7 may be built into an emergency responder's gear (e.g., uniforms, respirators, etc.) to the emergency responder.

As a non-limiting example, the camera component may be affixed to the helmet or respirator of a firefighter and the display component may be a heads-up display (HUD). As the firefighter moves his or her head, the camera component performs the type of scanning, and the HUD may be updated, as discussed above with respect to FIGS. 1-7. In this way, the emergency responder can have important information presented to him or her without the need to handle a separate device that may impede use of safety equipment. In various embodiments, the HUD may comprise a portion of the total area of the shield of the respirator, positioned such that the emergency responder 702 can view the augmented reality information in a non-intrusive manner. In other embodiments, the HUD may comprise the total area of the shield, providing a fully-immersive augmented reality experience.

Figure 8:
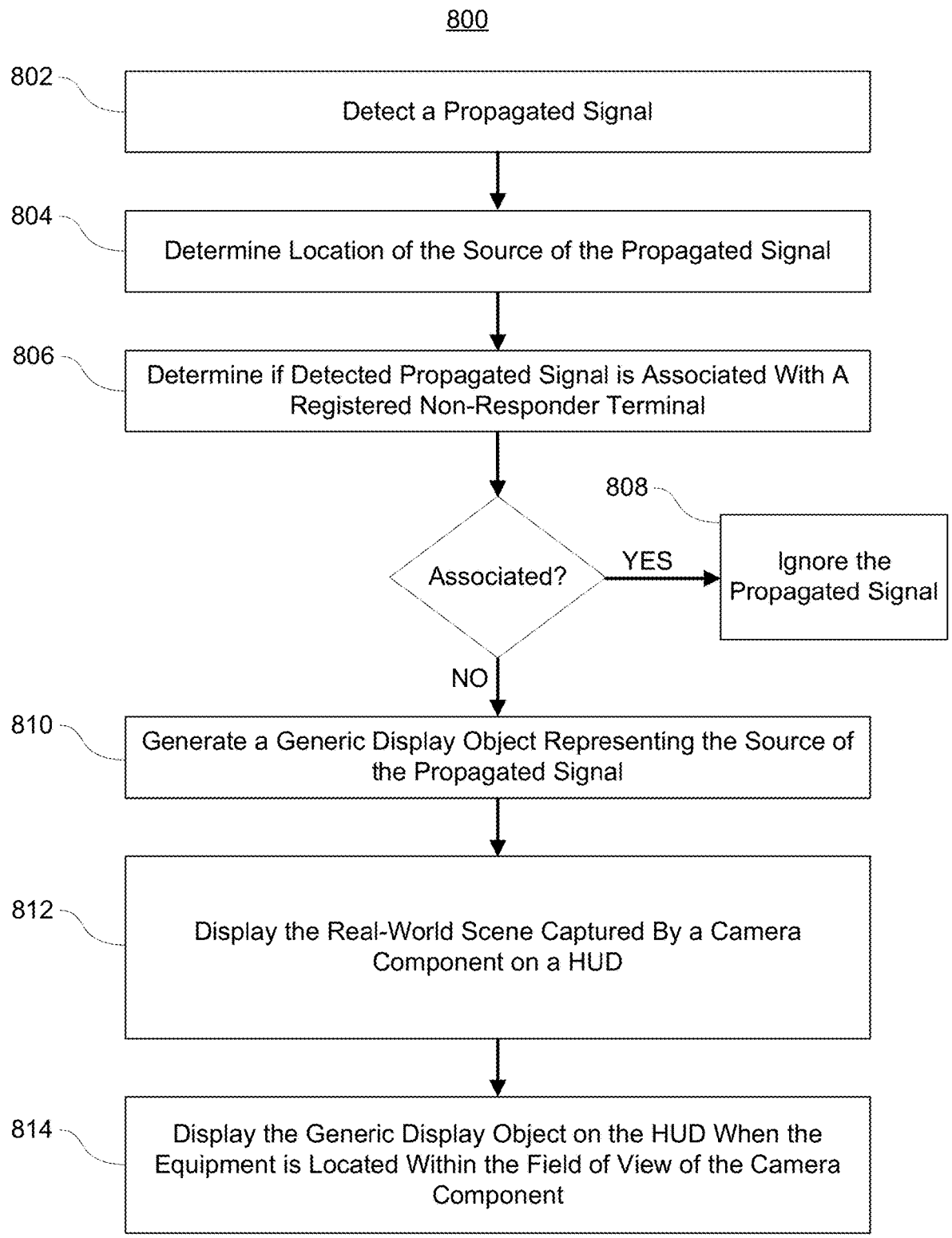
FIG. 8 illustrates an example method in accordance with embodiments of the technology disclosed herein.

FIG. 8 is a flow diagram illustrating an example method 800 in accordance with embodiments of the technology disclosed herein. The example method 800 may use one or more system resources of the ERS, like the system resources 200 discussed with respect to FIG. 2. At operation 802, a propagated signal is detected. In various embodiments, the propagated signal may be detected by one or more hardware components of an emergency responder terminal, like those discussed above with respect to FIG. 7. In various embodiments, one or more antenna or other signal capture devices may be included within an emergency responder terminal kept on an emergency responder's person, while in other embodiments separate from but communicatively coupled to the emergency responder terminal. In various embodiments, the one or more signal capture devices may be affixed to the equipment of an emergency responder and/or built into the equipment, like discussed with respect to FIG. 7.

At operation 804, a location of the source of the propagated signal is determined. In various embodiments, the location of the source may be determined based on a directional distance between the source and the emergency responder terminal. In some embodiments, the emergency responder terminal may extract location information from the captured propagating signal. In various embodiments, one or more non-terminal identification components may include hardware circuitry similar to the propagated signal circuitry discussed with respect to FIG. 7, and be configured to detect the propagated signal. The ERS may determine the location of the source by comparing the signal strength received at the non-terminal identification devices which surround the source.

At operation 806, the ERS determines if the detected propagated signal is associated with a registered non-responder terminal of the ERS. In various embodiments, the ERS may determine whether the propagated signal is associated with a non-responder terminal based on a comparison of the location associated with the propagated signal and the non-responder terminal. The determination may be made in a manner similar to determination discussed with respect to FIG. 7. If the signal is associated with a non-responder terminal, the propagated signal may be ignored at operation 808 and a display object for the non-responder terminal may be generated in a manner as discussed with respect to FIGS. 1-3G.

Where the propagated signal is not associated with a registered non-responder terminal, a generic display object representing the source of the propagated signal is generated at operation 810. The generic display object may be generated like discussed above with respect to FIG. 7.

At operation 812, the real-world scene is displayed as captured by a camera component of the emergency responder terminal on a HUD. In various embodiments, the camera component of the emergency responder terminal may be included within the same device as some or all of the other components of the emergency responder terminal, discussed with respect to FIGS. 1-2. In other embodiments, the camera component may be built into or other affixed to the emergency responder's person, and is communicatively coupled to the emergency responder terminal. As a non-limiting example, one or more image sensors comprising the camera component may be attached on one or more surfaces of a respirator used by firefighters. The one or more image sensors may be communicatively coupled to the one or more processors and other components comprising the emergency responder terminal over a wireless (e.g., Bluetooth®) or wired (e.g., a USB connection routed to the other components) connection.

At operation 814, when the source of the propagated signal falls within the field of view of the camera component, the generic display object is displayed on the HUD. The displaying of the generic display object may be performed in a similar manner as that discussed with respect to FIG. 1-6.

Referring to FIGS. 1-8 collectively, although these illustrate example embodiments with components, elements and circuits partitioned in the depicted manner, it will be appreciated by one of ordinary skill in the art that various components and circuits of ERS 100 (including any one or more elements and subsystems related thereto, individually or collectively) and described herein may be implemented utilizing any form of hardware, software, or a combination thereof. For example, one or more processors, controllers, ASICs, PLAs, PALs, CPLDs, FPGAs, logical components, software routines or other mechanisms, including associated memory, might be used to implement one or more components or circuits in embodiments of ERS 100 (including any one or more elements and subsystems related thereto) described in the present disclosure. In embodiments, the various components and circuits described herein might be implemented as discrete components or the functions and features described can be shared in part or in total among two or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, in various embodiments these features and functionality can be shared among one or more common software and hardware elements, and such description shall not require or imply that separate hardware or software components are used to implement such features or functionality.

Figure 9:
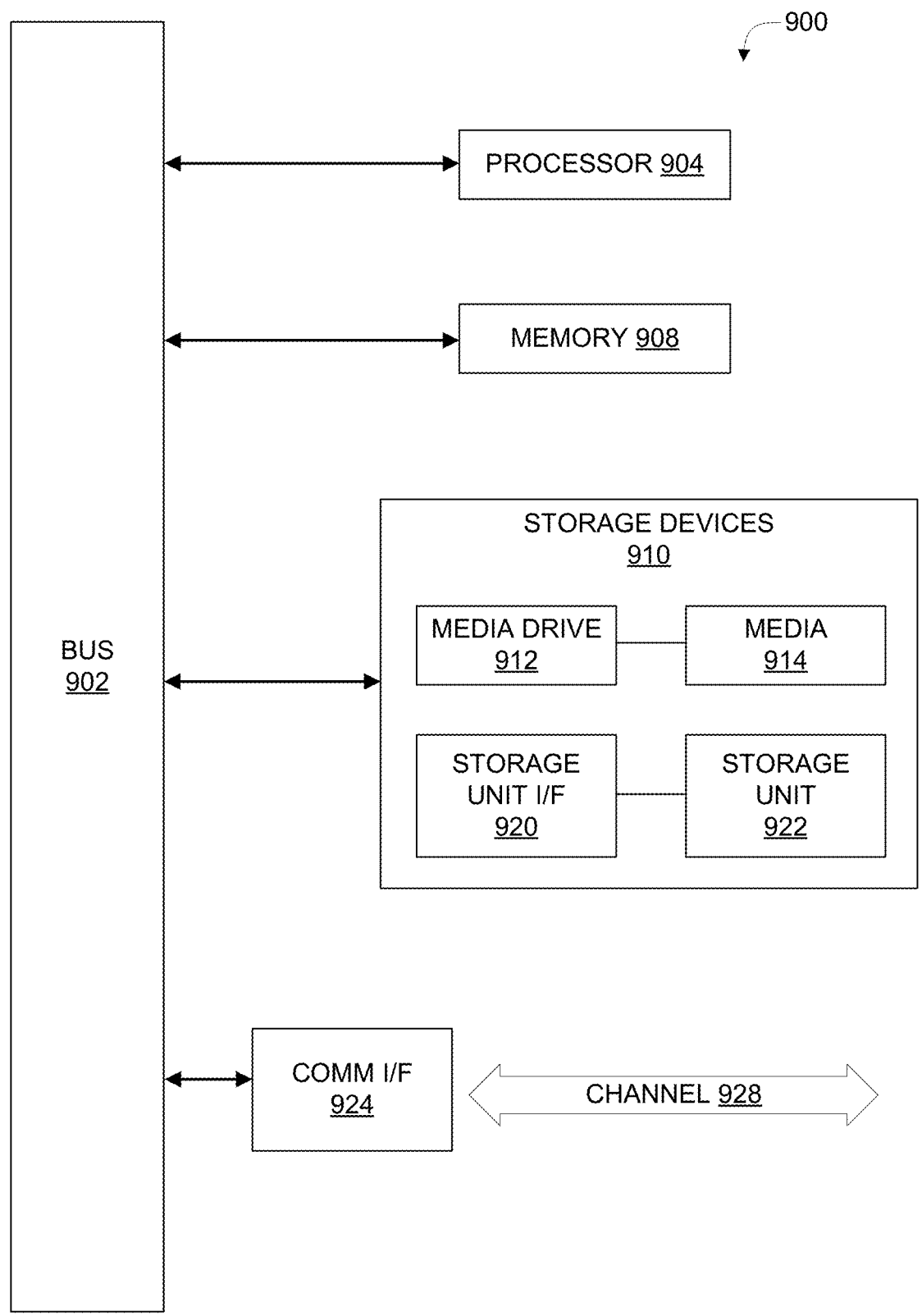
FIG. 9 is an example computing system in which embodiments described in the present disclosure may be implemented.

As used herein, the term "component" might describe a given unit of functionality that can be performed in accordance with one or more embodiments of the technology disclosed herein. As used herein, a component might describe a given unit of hardware that can be utilized, alone or in conjunction with software, to perform an operation (e.g., a camera component might include a CMOS array, an analog-to-digital converter, a sampling circuit, and software to create a permanent or temporary digital image information, for instance). Thus, as used herein, a component might comprise or be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components, or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the technology are implemented in whole or in part using software, in one embodiment, these software elements can be implemented to operate with a computing or processing component or engine capable of carrying out the functionality described with respect thereto. One such example computing component is shown in FIG. 9. Various embodiments are described in terms of this example-computing component 900. After reading this description, it will become apparent to a person skilled in the relevant art how to implement the technology using other computing modules or architectures.

Referring now to FIG. 9, computing component 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing component 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 810 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing component 900.

Computing component 900 might also include a communications interface 924 (e.g., communications component 226 shown in FIG. 2). Communications interface 924 might be used to allow software and data to be transferred between computing component 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

In common usage, the term "or" can have an inclusive sense or exclusive sense. As used herein, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusive" and "A or B but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    detecting, by a detector circuit of an emergency response system, a propagated signal from a device;
    determining, by a processor, a location of a source of the propagated signal, the location comprising a longitude measure, a latitude measure, and an altitude measure;
    comparing, by the processor, the location of the source of the propagated signal of the device with one or more known real-time locations of registered non-responder terminals of the emergency response system;
    determining, by the processor, if the device is associated with a registered non-responder terminal of the emergency response system, wherein the determination is based on the comparing;
    in response to determining the device is not associated with a registered non-responder terminal of the emergency response system, generating, by the processor of the emergency response system, a generic display object visually representing the location of the source of the propagated signal;
    capturing, by a camera component of the emergency response system, a real-world scene;
    displaying, on a heads-up display of an emergency responder terminal, the real-world scene captured by the camera component; and
    displaying, on the heads-up display, the generic display object visually representing the location of the source of the propagated signal when the source of the propagated signal falls within a field of view of the camera component,
    wherein visually representing the location of the source of the propagated signal comprises the generic display object being displayed in a physical position within the field of view with respect to a position of the emergency responder terminal.

2. The method of claim 1, wherein generating the generic display object comprises generating the generic display object such that the generic display object provides an indication of a distance from the location of the source of the propagated signal to the emergency responder terminal.

3. The method of claim 2, wherein the indication of the distance may comprise a variation in a size of the generic display object based on the distance.

4. The method of claim 2, wherein the indication of the distance may comprise a variation in the color of the generic display object based on the distance.

5. The method of claim 1, wherein determining the location of the source of the propagated signal is based on a signal strength of the propagated signal.

6. The method of claim 1, wherein determining the location of the source of the propagated signal comprises:
    obtaining, from a plurality of non-terminal identification components of the emergency response system, a signal strength value of the propagated signal detected by a detector circuit of each of the non-terminal identification components; and
    analyzing, by the processor, the obtained signal strength values of the plurality of non-terminal identification components;
    wherein the location is a position within a space defined by the plurality of non-terminal identification components determined based on the analysis.

7. The method of claim 1, wherein the processor is one or more processors of the emergency responder terminal.

8. The method of claim 1, wherein the processor is one or more processors of an emergency response system entity.

9. An emergency response system, comprising:
    an emergency responder terminal;
    a heads-up display communicatively coupled to the emergency responder terminal; and
    a non-transitory machine readable medium storing machine readable instructions that, when executed by a processor, cause the emergency response system to:
    detect, by a detector circuit of the emergency response system, a propagated signal from a device;
    determine, by a processor, a location of a source of the propagated signal, the location comprising a longitude measure, a latitude measure, and an altitude measure;
    compare, by the processor, the location of the source of the propagated signal of the device with one or more known real-time locations of registered non-responder terminals of the emergency response system;
    determine, by the processor, if the device is associated with a registered non-responder terminal of the emergency response system, wherein the determination is based on the comparing;
    in response to determining the device is not associated with a registered non-responder terminal of the emergency response system, generate, by the processor of the emergency response system, a generic display object visually representing the location of the source of the propagated signal;
    capture, by a camera component of the emergency response system, a real-world scene;
    display, on a heads-up display of the emergency responder terminal, the real-world scene captured by the camera component; and
    display, on the heads-up display, the generic display object visually representing the location of the source of the propagated signal when the source of the propagated signal falls within a field of view of the camera component,
    wherein visually representing the location of the source of the propagated signal comprises the generic display object being displayed in a physical position within the field of view with respect to a position of the emergency responder terminal.

10. The emergency response system of claim 9, wherein the instruction to generate the generic display object further includes sub-instructions to generate the generic display object such that the generic display object provides an indication of a distance from the location of the source of the propagated signal to the emergency responder terminal.

11. The emergency response system of claim 10, wherein the indication of the distance may comprise a variation in a size of the generic display object based on the distance.

12. The emergency response system of claim 10, wherein the indication of the distance may comprise a variation in the color of the generic display object based on the distance.

13. The emergency response system of claim 9, further comprising a plurality of non-terminal identification components, and the non-transitory machine readable medium storing machine readable instructions that, when executor by the processor, cause the emergency response system to further:
   obtain, from the plurality of non-terminal identification components of the emergency response system, a signal strength value of the propagated signal detected by a detector circuit of each of the non-terminal identification components; and
   analyze, by the processor, the obtained signal strength values of the plurality of non-terminal identification components;
   wherein the location is a position within a space defined by the plurality of non-terminal identification components determined based on the analysis.

14. The emergency response system of claim 9, wherein the camera component is affixed to a piece of emergency responder equipment such that the field of view of the camera component changes as an emergency responder changes a field of view of the emergency responder, the camera component being communicatively coupled to the emergency responder terminal.

* * * * *